United States Patent
Hazeghi et al.

(10) Patent No.: US 9,826,216 B1
(45) Date of Patent: Nov. 21, 2017

(54) SYSTEMS AND METHODS FOR COMPACT SPACE-TIME STEREO THREE-DIMENSIONAL DEPTH SENSING

(71) Applicants: Aryan Hazeghi, San Jose, CA (US); Carlo Dal Mutto, Sunnyvale, CA (US); Giulio Marin, Sunnyvale, CA (US); Francesco Peruch, Sunnyvale, CA (US); Michele Stoppa, Sunnyvale, CA (US); Abbas Rafii, Palo Alto, CA (US)

(72) Inventors: Aryan Hazeghi, San Jose, CA (US); Carlo Dal Mutto, Sunnyvale, CA (US); Giulio Marin, Sunnyvale, CA (US); Francesco Peruch, Sunnyvale, CA (US); Michele Stoppa, Sunnyvale, CA (US); Abbas Rafii, Palo Alto, CA (US)

(73) Assignee: AQUIFI, INC., Palo Alto, CA (US)

(*) Notice: Subject to any disclaimer, the term of this patent is extended or adjusted under 35 U.S.C. 154(b) by 0 days.

(21) Appl. No.: 15/274,994

(22) Filed: Sep. 23, 2016

Related U.S. Application Data

(63) Continuation of application No. 14/743,742, filed on Jun. 18, 2015.

(60) Provisional application No. 62/232,326, filed on Sep. 24, 2015.

(51) Int. Cl.
| | | |
|---|---|---|
| *H04N 13/02* | (2006.01) | |
| *H04N 5/225* | (2006.01) | |
| *G02B 27/30* | (2006.01) | |
| *G02B 27/42* | (2006.01) | |
| *G02B 27/48* | (2006.01) | |

(Continued)

(52) U.S. Cl.
CPC ..... *H04N 13/0239* (2013.01); *G02B 26/0808* (2013.01); *G02B 27/30* (2013.01); *G02B 27/425* (2013.01); *G02B 27/48* (2013.01); *H04N 5/2256* (2013.01); *H04N 13/0271* (2013.01); *H04N 2013/0081* (2013.01)

(58) Field of Classification Search
CPC .................................. G03B 21/14; F21F 1/06
See application file for complete search history.

(56) References Cited

U.S. PATENT DOCUMENTS

| | | |
|---|---|---|
| 8,749,796 B2 | 6/2014 | Pesach et al. |
| 8,995,057 B2 | 3/2015 | Miyasaka |
| 9,325,973 B1 | 4/2016 | Hazeghi |

(Continued)

*Primary Examiner* — Sultan Chowdhury
*Assistant Examiner* — Danell L Owens
(74) *Attorney, Agent, or Firm* — Michael A. Kaufman, Esq.

(57) ABSTRACT

A pattern projection system includes a coherent light source, a repositionable DOE disposed to receive coherent light from said coherent light source and disposed to output at least one pattern of projectable light onto a scene to be imaged by an (x,y) two-dimensional optical acquisition system. Coherent light speckle artifacts in the projected pattern are reduced by rapidly controllably repositioning the DOE or the entire pattern projection system. Different projectable patterns are selected from a set of M patterns that are related to each other by a translation and/or rotation operation in two-dimensional cosine space. A resultant (x,y, z) depth map has improved quality and robustness due to projection of the selected patterns. Three-dimensional (x,y, z) depth data obtained from two-dimensional imaged data including despeckling is higher quality data than if projected patterns without despeckling were used.

20 Claims, 9 Drawing Sheets

(51) Int. Cl.
  *G02B 26/08*  (2006.01)
  *H04N 13/00*  (2006.01)

(56) References Cited

U.S. PATENT DOCUMENTS

| | | |
|---|---|---|
| 2002/0071472 A1 | 6/2002 | Dickson |
| 2002/0196415 A1 | 12/2002 | Shiratani |
| 2009/0185274 A1 | 7/2009 | Shpunt |
| 2010/0225746 A1* | 9/2010 | Shpunt ............... G01B 11/2518 348/50 |
| 2010/0284082 A1* | 11/2010 | Shpunt .................. G01B 11/25 359/558 |
| 2011/0285866 A1 | 11/2011 | Bhrugumalla |
| 2013/0294468 A1 | 11/2013 | Sridharan |
| 2014/0193061 A1 | 7/2014 | Miller |
| 2015/0234291 A1 | 8/2015 | Patra |

* cited by examiner

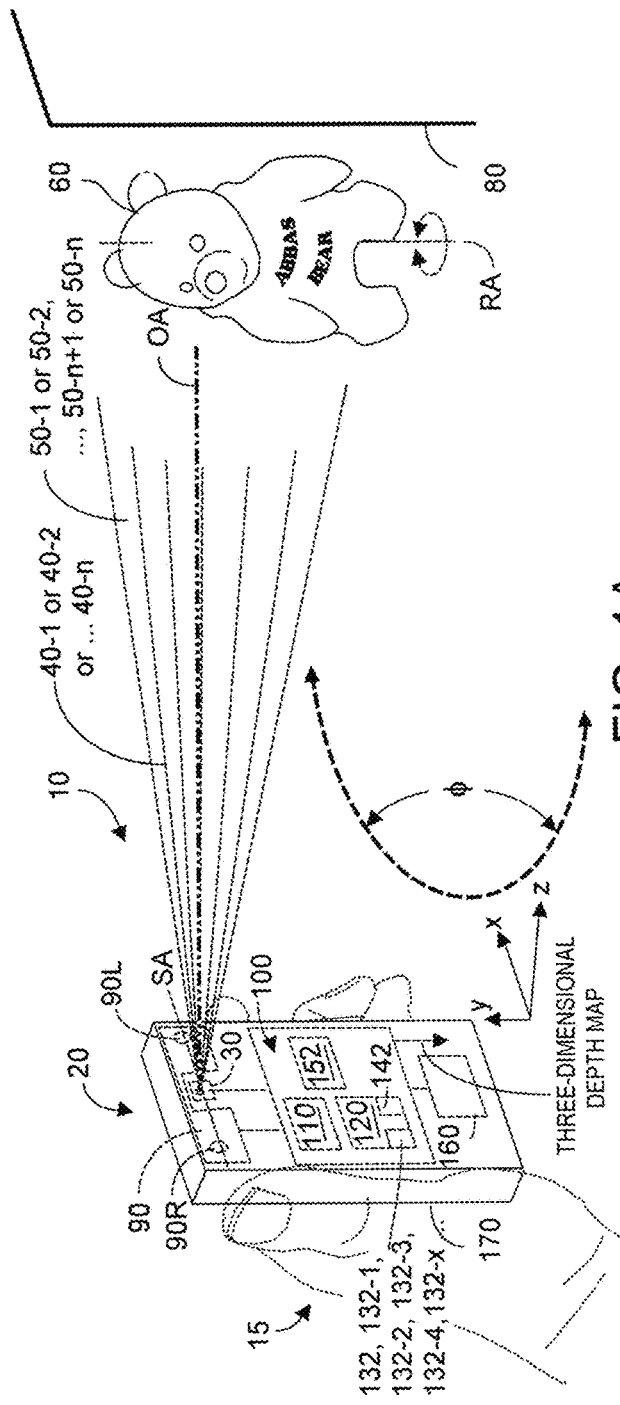
FIG. 1A
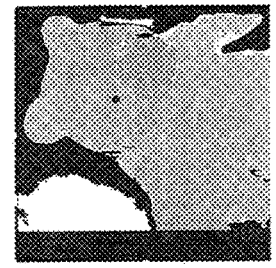
FIG. 1D (PRIOR ART)
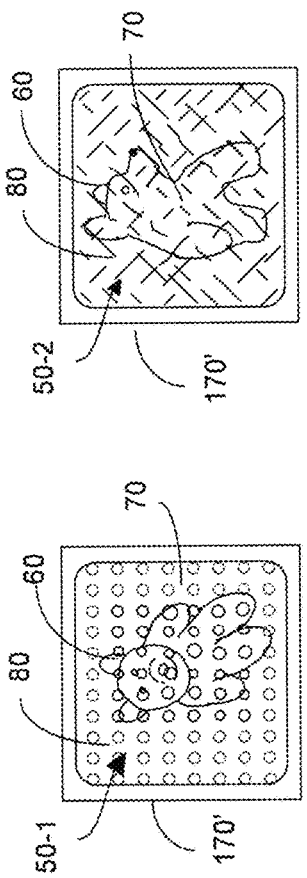
FIG. 1C
FIG. 1B

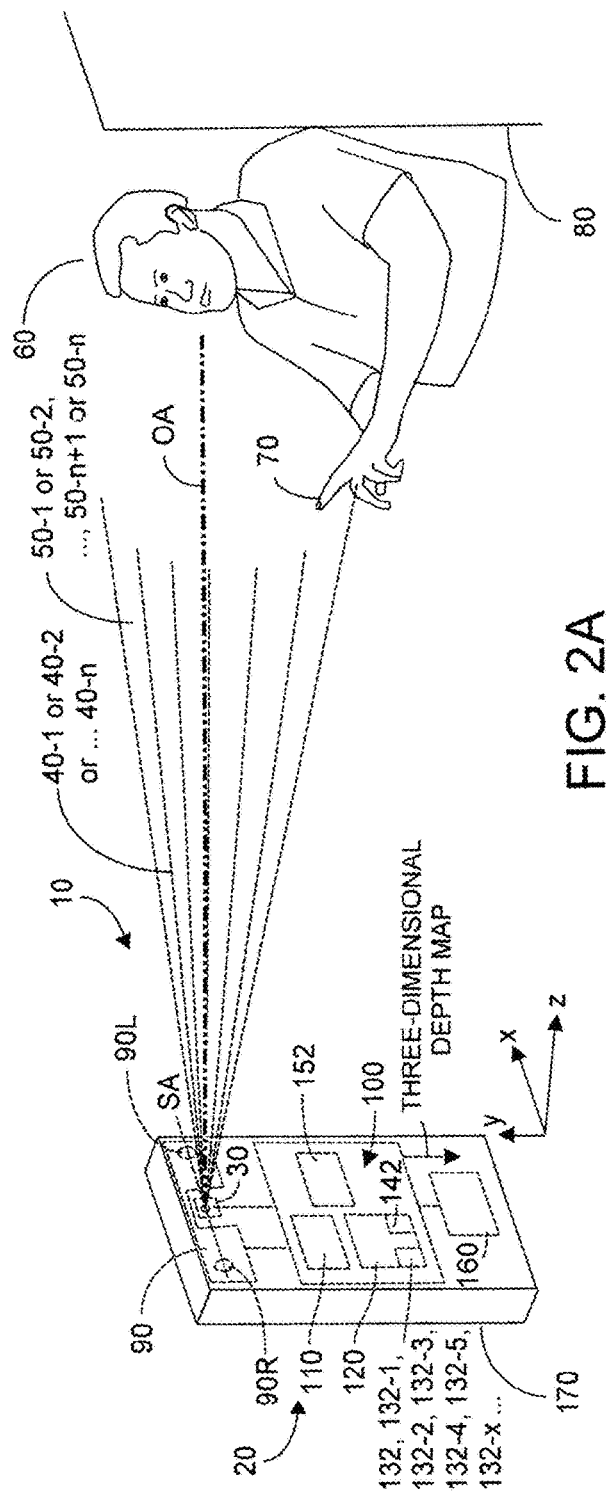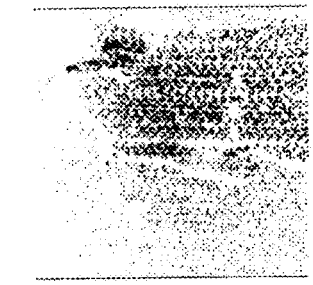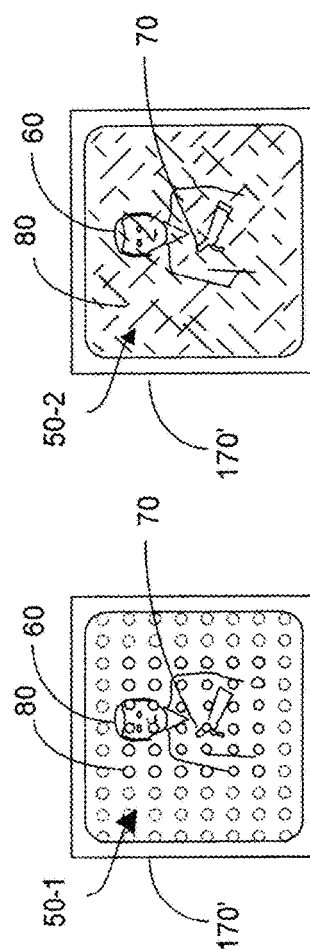

SYSTEMS AND METHODS FOR COMPACT SPACE-TIME STEREO THREE-DIMENSIONAL DEPTH SENSING

PRIORITY TO CO-PENDING APPLICATION

Priority is claimed from applicant's U.S. provisional patent application Ser. No. 62/232,326 filed 24 Sep. 2015 entitled "System and Method for Compact Space-Time Stereo 3D Depth Sensing", and from applicant's co-pending U.S. utility application Ser. No. 14/743,742 filed 18 Jun. 2015, entitled "3D Depth Sensor and Projection System and Methods of Operating Thereof". Said patent applications are incorporated herein in full by reference.

FIELD OF THE INVENTION

The relevant field of the invention is the creation of a three-dimensional (x,y,z) data depth map using typically two two-dimensional cameras to optically collect data from an imaged scene from different viewpoints. The collected two-dimensional (x,y) optical data is then processed to create a three-dimensional depth map and perhaps subsequently a three-dimensional model of what was imaged, including surface shapes, colors and textures (if RGB cameras are used), etc. In some contexts, the expression mapping may refer to the process of capturing a space in (x,y,z). More specifically, embodiments of the present invention relate generally to two-dimensional (x,y) systems and methods to rapidly capture high quality depth maps of an imaged scene including target object(s) within a video stream. The video stream is acquired by at least first and second spaced-apart two-dimensional cameras, and the data acquired by the cameras is used preferably in real-time to reconstruct three-dimensional (x,y,z) image data. In some applications the system is rotated relative to a target object so as to scan and acquire an (x,y,z) set of coordinates representing the surface of the scanned target object. In other applications, the system is stationery and captures imagery of a target object that may move.

Some two-dimensional systems include a projection system that projects one or more patterns onto the imaged scene. Such systems seek to robustly and rapidly generate three-dimensional depth data from scenes and target objects, even when imaged surfaces may otherwise be featureless. The systems that project more than one pattern over time, are called space-time systems, and may project a first pattern in a first direction towards the scene, and then project a second pattern in a second direction, and acquire multiple optical images over time. But prior art space-time methods tend to require pattern projection systems that are expensive, bulky, and consume too much operating power for mobile, battery operated devices including such systems.

By contrast, the present invention is directed to compact battery-powered mobile two-dimensional imaging systems having a pattern projection system that can generate and project patterns in space-time mode. When acquired by an optical acquisition system, the projected light patterns can be analyzed by a processor system to rapidly and accurately yield intelligent recognition of imaged target objects in the scene, using acquired depth data and other depth-based information.

BACKGROUND OF THE INVENTION

The physical world is full of three-dimensional objects, and there is a growing interest in portable cost effective systems and methods to produce depth data and depth-based information from such objects. Such objects or target objects in an imaged scene may include portion(s) of a human being. Without limitation if accurate depth data can be acquired, such data can assist in computational photography, implementing three-dimensional filters, scene layering, object tracking, motion tracking, three-dimensional scanning, homography, simultaneous localization and mapping (SLAM), dense tracking and mapping (DTAM), localization, measurement, metrology, and recognition of human made gestures.

Imaging systems that optically examine a scene to discern target object(s) within, and then try to discern three-dimensional information as to the imaged scene and target object(s) are known in the art. Imaging systems typically employ an optical system to acquire images of a scene that may include at least one target object of interest, perhaps a human user or a portion of such user's body. In addition, imaging systems further include a processing system to process data acquired by the optical acquisition system, to discern desired three-dimensional information regarding the imaged scene. As described herein, camera(s) used in the optical acquisition system may include ordinary color RGB cameras, depth or range cameras, or a combination of both, sometimes referred to as RGB-D, where D denotes a depth image where each pixel in the camera pixel sensor array encodes the z-axis depth (or distance) information of the imaged scene. In brief, the depth image can be obtained by different methods including geometric or electronic. Examples of geometric methods include passive or active stereo camera systems and structured light camera systems. Examples of electronic methods to capture depth image include Time of Flight (TOF), or general scanning or fixed LIDAR cameras.

Some known three-dimensional depth sensors use a companion projection technique to assist in three-dimensional reconstruction. These approaches may include projecting one or more encoded patterns (typically used in the so called structured-light methods), projecting a pattern to create texture on the scene, or projecting a pattern that is optimized for three-dimensional reconstruction. The latter two techniques may be used in systems with two or more cameras (e.g., stereoscopic systems). The advantages of using two or more cameras as opposed to just one camera, as is generally the case in structured-light methods, include robustness against deviations in the projection pattern from the ideal design specification and the ability to operate in high ambient light situations where the projection pattern cannot be distinguished by the camera system.

In so-called time-of-flight (TOF) imaging systems the optical acquisition system emits optical energy whose return echoes are examined by a TOF camera system to acquire true three-dimensional data from the imaged scene. Exemplary TOF imaging systems were developed by Canesta, Inc. and are described in numerous patents to Canesta, Inc., now assigned to Microsoft, Inc. However, TOF imaging systems can be expensive and may be unsuitable for battery operated portable use due to their large form factor and substantial operating power requirements.

Other imaging systems that employ two-dimensional optical acquisition systems are also known in the art. Such optical acquisition systems acquire two-dimensional image data that is processed to reconstruct three-dimensional image data. Exemplary such systems in which the optical acquisition system includes at least two spaced-apart two-dimensional cameras have been developed by Imimtek, Inc. (subsequently renamed Aquifi, Inc.) and are described in numerous patents assigned to Aquifi, Inc. of Palo Alto, Calif.

The acquired two-dimensional data is processed such that a small number of landmark points sufficient to recognize an imaged target object are rapidly determined. Other less sophisticated two-camera imaging systems attempt to acquire stereographic two-dimensional images from which three-dimensional data can perhaps be discerned.

But three-dimensional space-time reconstruction algorithms commonly used with such systems are not very useful when imaging general dynamic scenes. This is because stereo matching must confront fundamental problems associated with triangulation, and more challengingly with correspondence estimation, which is associating points between images of the same scene acquired by the two spaced-apart two-dimensional cameras. Estimation of correspondences generally involves locally comparing one image in proximity to a specific point with the second image in proximity of any possible match. Local comparison is based on spatial image similarity, e.g., absolute difference. In practice, the imaged scene may change too fast for real-time stereo matching data to be computed.

In other so-called structured light imaging systems, the optical acquisition system includes a pattern generator that projects a predefined pattern of light onto the imaged scene, and employs a pair of two-dimensional cameras that image the scene. Typically the light pattern is generated using a passive immutable diffractive optical element (DOE) that transforms an incoming optical wavefront into a desired but immutable (i.e., not changeable) output light pattern for projection onto the imaged scenery. DOEs are diffraction-based and redirect light away from dark pattern regions, thus promoting efficiency and low power consumption.

In structured-light systems, the projected light pattern typically becomes altered when falling upon different surfaces in the imaged scene. For example, a projected light pattern may appear distorted when projected onto differently shaped target object surfaces in the imaged scene, or may appear less focused and less intense when projected onto more distant or less reflective regions of the imaged scene. The scene and projected light patterns is acquired by an optical acquisition system. Two-dimensional image data from the optical acquisition system is processed to determine surfaces and shapes of imaged object(s) that could produce the acquired observed light pattern distortion. Exemplary structured-light systems are described in patents to Prime Sense, Inc., now assigned to Apple, Inc. Some structured light systems employ the above-described space/time methodology by repeatedly computing the absolute difference for several acquisitions of the same scene on which different patterns are projected. But while this approach may work with fairly stationary images, it is difficult in practice to carry out real-time computations needed to reconstruct three-dimensional data where object(s) in the imaged scene are dynamic rather than stationary.

Structured light systems would further benefit if projected patterns could somehow be changed dynamically in real-time. For example such dynamically changeable patterns could better accommodate target objects lacking suitable texture and/or shape to improve the ability of a processing system to discern small shifts or disparities between frames of optical data acquired from at least two two-dimensional cameras in an optical acquisition system. Other projectable patterns might be useful to discern over a spatial dynamic range to more readily determine depth estimates to target objects that may be relatively close or far, or to more rapidly accommodate temporally rapidly changing target objects as opposed to less dynamically changing imagery. But while DOEs are robust, passive, and inexpensive to fabricate, in optical projection applications they are designed and fabricated to satisfy a specific optical energy input/output transfer function. In response to incoming optical energy, the DOE produces, or outputs, a single immutable pattern of structured optical energy in the so-called spatial frequency or holographic order space. However, the output pattern is immutable and cannot be changed without physically altering the internal construction of the DOE to alter its transfer function. In practice, internally modifying a DOE on-the-fly to dynamically change its output pattern of optical energy is not possible. U.S. Pat. No. 9,325,973 (2016) entitled Dynamically Reconfigurable Optical Pattern Generator Module Useable With a System to Rapidly Reconstruct Three-Dimensional Data, assigned to Aquifi, Inc. (assignee herein) describes a modern such system in which a second DOE is dynamically moveable with respect to a first DOE to intelligently reconfigure the optically projected pattern.

Another prior art approach to creating changing patterns of light projections on-the-fly might uses a digital light processing (DLP) projection system, including micro-electro-mechanical systems (MEMS) digital micro-mirror devices (DMD). But in practice, DLP systems are not suited for battery operable mobile structured light systems due to their relatively high cost and multi-watt power consumption, complex optics with resultant large form factor and relatively narrow projection fields of view. Such prior art DLP projectors redirect light rays onto a scene to generate bright pattern regions. But much optical energy is inefficiently dissipated by being redirected onto a heat sink and away from the scene, to produce dark pattern regions. By contrast, prior art DOEs have a much more compact form factor, and are more efficient in that they merely direct light away from dark pattern regions in the scene. Some prior art projection systems incorporate liquid crystal-on-silicon projectors, which like many projector type devices may operate over a larger wavelength compared to DOEs. But such larger wavelength operable projection systems are characterized by high energy losses.

What is needed is a method and system whereby three-dimensional image data can be rapidly reconstructed for an optical acquisition system comprising two-dimensional cameras and a pattern generator system using a single DOE. Such system and methods should enable three-dimensional reconstruction including use of so-called space-time methods of pattern generation and three-dimensional reconstruction. Such systems and methods should function well even if what is imaged by the optical acquisition system includes dynamic scenes including dynamic target object(s), and/or target objects that are relatively near or relatively far from the optical acquisition system, and/or target objects whose surface may be texturally unremarkable or even planar or are dimly lit by ambient light. Preferably embodiments of such methods and systems should be useful to scan a target object, and in some embodiments, carry out recognition of user gestures made by a target object. Such systems and methods should be implementable with small form factor perhaps even a wearable form factor, with efficient low power consumption, and should include a pattern generator system that is dynamically reprogrammable to project patterns most suitable to the scene currently being imaged, including so-called space-time patterns.

SUMMARY OF THE INVENTION

The present invention provides a compact, low power consumption pattern projection system useable with two-dimensional imaging systems that imagine a scene with an optical acquisition system, typically a pair of two-dimensional cameras, and have a processing system that reconstructs a three-dimensional (x,y,z) image map from the optically acquired image data, which includes patterns projected onto the imaged scene by a pattern projection system. Embodiments of the present invention intelligently generate and project at least two patterns to aid in generating a three-dimensional map from the imaged scene using space-time methods. Further, embodiments of the present invention can despeckle the acquired imagery, where undesired speckling is an artifact caused by the coherent light source used to efficiently project image patterns.

A pattern projection system according to embodiments of the present invention includes a light source preferably emitting coherent optical energy along an optical axis (or z-axis), a single hybrid optical element (HOE) that includes a single diffractive optical element (DOE) disposed to receive and to collimate at least some optical energy from the light source, and an actuator coupled to the DOE to mechanically reposition the DOE through at least one degree of freedom normal to the optical axis (z-axis). In some embodiments, a light source facing first (or front) surface of the DOE receives the incoming optical energy, which it disperses or spreads out into the structure of the DOE. The second (or back) surface of the DOE both collimates and generates patterns that are projected onto the scene to be imaged. In the various embodiments, for each actuator-repositioning the DOE generates a pattern of light for projection onto the scene to be imaged. Different projection patterns are thus generated and projected as output from the DOE as the actuator repositions the DOE under control of the processing system in the two-dimensional imaging system. In such embodiments, the actuator and DOE repositioning effect a relatively inexpensive and small form factor physical implementation of a mathematical shift in the pattern that is generated and projected onto the imaged scene.

A set or family M of projectable patterns is thus created, where the patterns are related by a deterministic transformation operation related to the mechanical actuation of the DOE. In some space-time pattern embodiments, optical information acquired from a previous frame or frames $\Delta t_j$, j<i during which different pattern member(s) of set M were projected is used by the processor to intelligently select a pattern to be generated and projected in a subsequent frame. Set M is not an assemblage of arbitrary patterns, but rather a constrained rather than arbitrary family of patterns that provide pattern diversity to realize benefits of time-space depth methodology, according to the present invention. In this fashion maximal depth information can be acquired in subsequent acquisition frames, based upon depth information acquired in earlier frames. This method can be carried out frame-by-frame, typically 30 frames/sec (fps) or perhaps 60 fps, during image acquisition by the optical acquisition system. The projection of successive patterns can provide successively additional information to the optical acquisition system and the processing system to improve depth measurements of a scene that may include static and/or dynamic target objects of potential interest. The processor system includes at least a processor, memory, and algorithm routines stored in memory and executable by the processor to carry out pattern actuator control and resultant pattern generation, analyses of (x,y) imagery acquired by the optical acquisition system, and generation of an (x,y,z) three-dimensional depth map of the imaged scenery.

The projected patterns falling upon target object(s) can augment parallax information when the scene is imaged by the optical acquisition system, to assist in more rapidly producing accurate three-dimension (x,y,z) reconstruction of the imaged scene. The use of at least first and second patterns from the pattern set M contributes to the robust and efficient detection of disparity in the imagery acquired by the system, and facilitates more robust, rapid, and precise (x,y,z) depth estimation and target object identification and (x,y,z) data reconstruction, over various target object surfaces. In some applications such identification can advantageously be used to more rapidly and accurately acquire and recognize user gestures, when the target object includes at least part of a human making the gestures.

In space-time pattern embodiments, the pattern projection system can handle one or both of patterns especially suited for both large amplitude, low frequency motion of target object(s) to be acquired, and of small amplitude, high frequency motion of target object(s) to be acquired. Low and high frequency are relative terms in reference to the acquisition rate of the optical acquisition system (perhaps 30 fps). In such operation modes, the pattern generation and projection system preferably generates and projects a first pattern during a first exposure frame of the optical acquisition system, and then generates and projects a second pattern during a second exposure frame. This methodology yields a mathematical shift in the generated pattern that is projected onto the scene to be imaged. The scene imagery including projected patterns is sampled and detected by the optical acquisition system, to more rapidly and robustly acquire an accurate three-dimensional (x,y,z) depth map.

In small amplitude, high frequency operation modes, the frequency associated with projected pattern shift is high relative to the exposure system of the optical acquisition system. Thus, in this mode, projected pattern shift movement may be in the 3 kHz to 30 kHz range, about 100× to 1000× faster than the nominal 30 fps exposure (or integration) time period associated with conventional imaging sensor arrays in the optical acquisition system. This mode of operation advantageously can enhance the signal/noise in the imagery acquired by the optical acquisition system, particularly when the noise results from imaging of a pattern produced by a coherent light source, commonly referred to in the art as laser speckle noise. In this mode, optical artifacts arise because what is projected by the coherent light source in the pattern projection system is not idealized dots of light, but rather light rays that have a nearly Gaussian distribution profile of intensity and phase across the imaged scene and target object(s) within. It is the pattern generation using a coherent light source and their associated overlapping of projected profiles leads to phase interference. Consequently, there is a rapid spatial fluctuation of absolute detected optical energy, where rapid refers to a high spatial frequency as compared to the beam waist of the Gaussian profile. In one embodiment of this mode, an actuator under command of the processor system is used to controllably mechanically slightly vibrate the DOE used in the pattern generator system. Such vibration advantageously despeckles the pattern of projected dots as the projection pattern is integrated in the optical acquisition system imaging sensor(s) over time. This despeckling can improve the signal/noise ratio (SNR), as the coherent nature of the projected pattern can produce absolute intensity fluctuations at the periphery of the three-dimensional projected light dots, where profile-tails from adjacent dots can overlap and add constructively or destructively in phase. As noted, vibratory frequency is preferably on the order of 100× to 1000× faster than the typically 30 ms integration time associated with the array sensors within the optical acquisition system cameras. These various modes of operation advantageously can enhance the signal/noise ratio in the imagery acquired by the optical acquisition system. Some embodiments may further operate in closed-loop feedback fashion to substantially optimize pattern to shift-pattern generation and projection on-the-fly as appropriate to the nature of the scene being imaged at a given time.

Other features and advantages of the invention will appear from the following description in which the preferred embodiments have been set forth in detail, in conjunction with their accompanying drawings.

BRIEF DESCRIPTION OF THE DRAWINGS

FIG. 1A depicts a dynamically reconfigurable optical pattern generator system (PGS) system that intelligently generates and projects patterns onto an image scene, used with a two-dimensional imaging system to rapidly acquire multiple two-dimensional images of a target object from which to reconstruct three-dimensional (x,y,z) image data, according to embodiments of the present invention;

FIG. 1B and FIG. 1C depict exemplary different views of the target object acquired from different acquisition angles φ in FIG. 1A, as well as first and second exemplary patterns projected by the optical pattern generator upon the target object, as though the patterns were visible to the human eye, according to embodiments of the present invention;

FIG. 1D depicts an exemplary depth map of a Teddy bear target object acquired by a two-dimensional imaging system, according to the prior art;

FIG. 2A depicts a dynamically reconfigurable optical pattern generator system (PGS) system that intelligently generates and projects patterns onto an image scene, used with a two-dimensional imaging system to rapidly acquire multiple two-dimensional images of a target object from which to reconstruct three-dimensional (x,y,z) image data useful in rapidly recognizing gestures made by human target objects, according to embodiments of the present invention;

FIG. 2B and FIG. 2C depict exemplary different views of the target object acquired from different acquisition angles φ in FIG. 1A, as well as first and second exemplary patterns projected by the optical pattern generator upon the target object, as though the patterns were visible to the human eye, according to embodiments of the present invention;

FIG. 2D depicts an exemplary pattern emitted by a pattern projection system, according to embodiments of the present invention;

DETAILED DESCRIPTION OF THE PREFERRED EMBODIMENTS

Figure 3B:
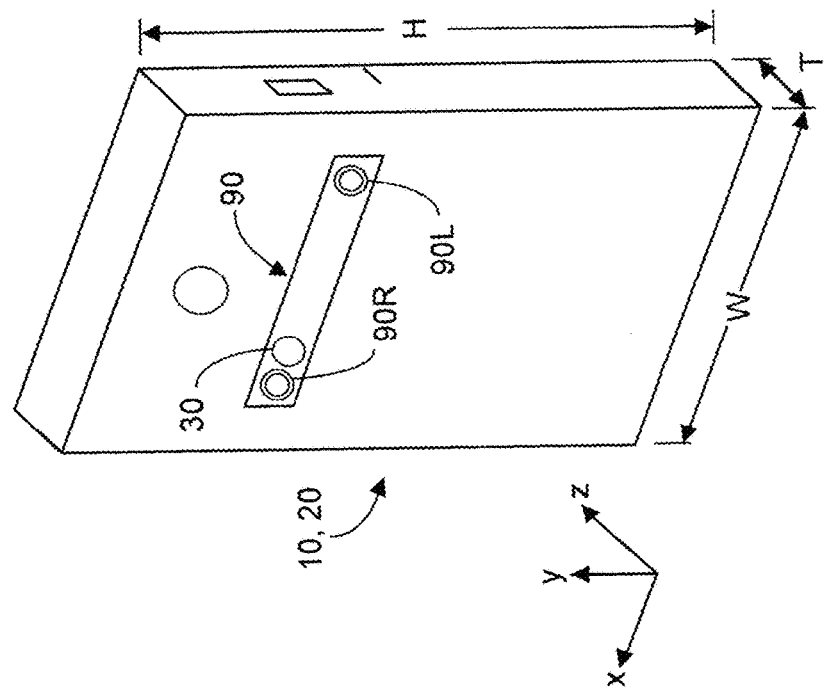
FIG. 3B depicts a two-dimensional imaging system device with an integrated rear facing optical acquisition system, according to embodiments of the present invention.

It is known in the art that a collimated light source is desirable in two-dimensional imaging systems whose pattern generator system projects at least one pattern onto a scene, at least at portion of which is imaged by an optical acquisition system. The presence of appropriately created and projected patterns in the imaged scene helps the processor system in the two-dimensional imaging system rapidly acquire useful three-dimensional (x,y,z) depth map data from the two dimensional (x,y) data acquired by the optical acquisition system. However, embodiments of the present invention recognize that projected light patterns of collimated light do not fall upon the imaged scene including target object(s) of interest therein, as perfectly formed dots of light. In practice, rather than perfect dots what is projected are light rays that have a nearly Gaussian distribution profile of intensity and phase across the imaged scene and target object(s) within. Within the scene as imaged by the optical acquisition system, there occurs associated overlapping of projected distribution profiles that can combine constructively or destructive, and disadvantageously result in phase interference. An undesired result is referred to as speckling, a rapid spatial fluctuation of absolute detected optical energy intensity, where rapid refers to a high spatial frequency as compared to the beam waist of the Gaussian profile. As described following, embodiments of the present invention can implement despeckling, to intelligently minimize such adverse artifacts associated with the use of a coherent light source in a pattern projection system.

Embodiments of the present invention seek to minimize such undesired pattern artifacts by employing at least one despeckling approach, preferably by providing pattern projection system that includes a single repositionable diffractive optical element (DOE). Despeckling may be described in terms of space-time generation and projection of patterns of collimated light onto a scene to be imaged. In one aspect, large amplitude, low frequency motion modes, different patterns in a family or set of patterns M are created and projected in different frames $\Delta t_i$ of imagery acquired by the optical acquisition system, preferably at least first and second spaced-apart two-dimensional cameras, each having an (x,y) plane of sensor pixels. The term low frequency is relative to the optical acquisition system frame rate, typically 30 fps, or 30 Hz.

During a first frame $\Delta t_1$ a first pattern of light, preferably collimated by the DOE, is projected onto the scene and is imaged, and during a second frame $\Delta t_2$ a second pattern of collimated light is projected and imaged. Use of appropriate such patterns selected from a pattern family M is analogous to a mathematical shift in the sampling pattern. Change in patterns to be generated and projected preferably result from repositioning of the single DOE by an actuator, in any degree of freedom including rotation, along any axis normal to the optical axis. Patterns generated from pattern set or family M preferably are related by translation and/or rotation repositioning of a single DOE by an actuator in two-dimensional cosine space. In some embodiments the pattern created and generated by pattern projection system 30 may be a series or other arrangement of illuminated dots or points. Customization or optimization of which patterns to generate take into account relationship constraints within the pattern set M. In some embodiments, generation of the pattern members of the set M advantageously uses the incidence-angle dependence property of multi-function holographic optical elements, particularly those with optical lensing capability, i.e., able to change divergence of the optical energy. Preferably, determination of what patterns to generate is carried out by the processor system 100, with processor 110 executing at least one routine stored in memory 120 (see FIG. 1A).

A second aspect may be described as using a small amplitude, high frequency motion, in which pattern change is high frequency relative to the typically 30 fps integration exposure rate of the optical acquisition system, i.e., perhaps 100 to 1,000 times more rapid, which is to say about 3 kHz to about 30 kHz. This mode enhances the signal/noise ratio in the optically acquired imagery, primarily due to the coherent nature of the light source used to project the various patterns onto the imaged scene. This is analogous to inverted three-dimensional Gaussian cone shaped points of projected light, whose periphery cone edges may constructively or destructively combine to yield undesired pattern artifacts. In a third mode of operation, the pattern projection system may be physically shaken with a suitable mechanical actuator so as to despeckle at least some of the randomly disposed pattern artifacts, to enhance signal/noise in the optical acquisition system data. Mechanical vibration would again be in the about 3 KHz to about 30 kHz range. According to embodiments of the present invention, a pattern projection system may employ one or more of such modes of pattern generation, separately, e.g., one mode or another mode, or as regards the second aspect described above, in superimposition, due to the substantially differencing frequencies involved.

FIG. 1A depicts a system 10, which according to embodiments of the present invention preferably is handholdable by a user 15 (drawn in phantom to avoid cluttering the figure) and includes a portable preferably battery powered device 20 that houses a pattern projection system 30 that defines an optical axis OA (coincident with z-axis) and includes a light source preferably outputting coherent light, and a hybrid optical element (HOE) that includes a single actuator-repositionable diffractive optical element (DOE) that spreads and collimates light source optical energy to generate and output for projection an optical field 40 that includes at least one projected pattern e.g., for projection at least one pattern. 50-1 or 50-2 or 50-3 . . . 50-n onto a scene. As described later herein, actuator repositioning (including rotation) of the DOE along any axis normal to the optical axis generates one pattern from a family M of patterns onto the scene to be imaged by an optical acquisition system. As described later herein, preferably a first (or front) DOE surface (the surface facing a source of coherent but uncollimated light) expands incoming optical energy from the light source. The second (or rear) DOE surface collimates the light and generates a pattern for projection The exemplary imaged scene in FIG. 1A is shown as including a first target object 60 (a stuffed teddy bear toy) having a rotational axis denoted RA, and background imagery 80, here a planar wall. Also housed within device 20 is an optical acquisition system 90, shown here as including first and second two-dimensional cameras 90L (left) and 90R (right), preferably disposed on a common x-axis with output optical energy emitted from projection system 30. Left and right cameras 90L and 90R may have an array of RGB color sensors, IR sensors, black/white sensors, and the two cameras 90L, 90R need not be identical to each other. Preferably cameras 90L, 90R are symmetrically disposed relative to the point of emanations of optical energy from pattern projection system 30, as indicated by symmetrical axis SA. Note too that the z-distance range between device 20 and imageable target object(s) 60, 80 is far greater than the distance between pattern projection system 30 and optical acquisition system 90. More than two cameras may be employed, e.g., to enhance robustness against deviations in the patterns as actually projected compared to an ideal pattern specification, and to assist operation of optical acquisition system 90 in applications where high ambient light may tend to interfere with acquisition of projected patterns.

In addition to housing pattern projection system 30 and optical acquisition system 90, device 20 preferably also houses a processing system 100. Processing system 100 preferably includes at least one processor 110, memory 120 storing at least one set of pattern generation instructions 132, a lookup table 132-1 of stored projectable patterns and associated Δ DOE reposition distances to command each pattern, at least one inference algorithm 132-2 to intelligently select stored patterns for projection based upon current optically acquired data to optimized generation of a three-dimensional depth map, a feedback optimization algorithm 132-3 to dynamically improve quality of imaged projected patterns, a scanning routine 132-4, a three-dimensional reconstruction algorithm 142 to generate a three-dimensional (x,y,z) depth map of what was imaged by optical acquisition system 90. (It is understood that the nomenclature in FIG. 1A of software 132-x means they may be a large variety of stored routines, e.g., 132-99, 132-100, etc.) Also preferably housed within device 20 is an input/output (I/O) interface 150 that preferably can couple closed-loop feedback information from optical acquisition system 90 to processor system 100 and pattern projection system 30, e.g., to dynamically optimized pattern generation according to the nature of the scene being imaged at the moment. Device 20 preferably further houses an internal power supply, e.g., a battery 160. Processing system 100 is coupled to communicate bilaterally with both projection system 30 and optical acquisition system 90.

In some embodiments device 20 may include a display 170, disposed here on the rear side of the device, that can depict imagery acquired by optical acquisition system 90, and/or such imagery after processing by processor system 100. In other embodiments such pre- and/or post-processing imagery may be ported, wirelessly or otherwise, to an external display 170'. In practice embodiments of system 10 can acquire and use optical information obtained from target objects over a z-range as close as about z=5 cm to as far as about z=15 m. Note that the distance between right and left cameras 90R, 90L and pattern projection system 30 is small relative to the z-distance between system 30 and imaged target objects, e.g., 60, 70, 80. As such it is understood that FIG. 1A and the other figures herein are not drawn to scale.

Three-dimensional reconstruction by processor system 100 of optical information acquired by optical acquisition system 90 in FIG. 1A calculates estimates of z-distance from the surface of target object(s), e.g., 60 to pattern projection system 30 based upon disparity of the target object(s) acquired by camera 90L and by camera 90R. Essentially the same acquired target object is compared in image data frames acquired from each camera 90L, 90R from their respective positions and disparity in the two frames is examined. The embodiment of FIG. 1A preferably is used to scan target object 60. User 15 may move portable device 20 relative to the target object, acquiring images through a scan angle φ. Indeed user 15 may literally move device 20 through a scan angle φ of 360°, going completely around target object 60. If desired, device 20 could of course be mounted on a mechanical arm that pivots about axis RA associated with target object 60, pivoting perhaps a full 360°. Alternatively device 20 may be stationary (indeed need not even be hand holdable in size) and target object 60 may be rotated about a rotation axis RA, perhaps rotated through an angle ⊖ of 360°, while device 20 acquires imagery.

In either embodiment optical acquisition system 90 can acquire many images of different aspects of the target object, i.e., perhaps full frontal view, segueing into a frontal-left view, segueing into a left view, etc. In some applications it may be desired that device 20 scan and acquire imagery of target object 60 perhaps over a full 360° range that encompasses the full perimeter of the target object. Such full image scanning enables the three-dimensional (x,y,z) depth map data output from device 20 to be acquired for the full surface of target object 60. By way of example, the (x,y,z) depth map data may be used, without limitation, as input perhaps to a three-dimensional lathe or three-dimensional printer, to create a model of target object 60, which model may be scaled up or down relative to the actual size of the scanned target object. A variety of other applications for the output (x,y,z) depth map data also exist.

The use of projected patterns can facilitate acquisition of good, robust (x,y,z) data. Patterns, e.g., 50-1, 50-2 generated and projected by pattern projector system 30 fall upon and are reflected by target object 60, 80 for acquisition by optical acquisition system 90 cameras 90L, 90R. As described herein, the inclusion of appropriate patterns in the imaged scene can create the effect of texture and/or illumination in areas of the imaged scene lacking texture or illumination. The inclusion of projected patterns can provide additional parallax information that can improve the speed and accuracy of the three-dimensional reconstruction process by processor system 100. Advantageously, embodiments of the present invention can provide projected patterns that intelligently despeckle the imagery as acquired by optical acquisition system 90.

Each camera 90L, 90R includes its own two-dimensional pixel array upon which optical energy received by optical acquisition system 90 falls. Each camera acquires optical imagery from its own vantage point of the target object and patterns projected thereon. As such the acquired imagery includes disparity information than can facilitate three-dimensional data reconstruction. Essentially the different projected patterns can convey different and complementary information based upon the imaged scene acquired by cameras 90L, 90R, Typically optical acquisition system 90 acquires optical images at a sufficiently rapid frame rate, e.g., 30 fps or perhaps 60 fps., such that rapid three-dimensional data reconstruction by processor system 100 can be achieved, even if in applications (see FIG. 2A) the imaged scene includes target object(s) that are moving rapidly. Projected patterns can be changed substantially more rapidly than the frame rate of acquisition of optical data by cameras 90L, 90R, typically about 16.7 ms for a 30 fps acquisition frame rate optical acquisition system 90.

FIG. 1B and FIG. 1C depict conceptually how use of different patterns, e.g., 50-1, 50-2, projected by system 30 in FIG. 1A can provide discernable clues including disparity information within the acquired imagery to processor system 100 as to the nature and location of target objects, e.g., 60, 80. System 10 may include a built-in display 170, or may export video wirelessly or otherwise to an external display 170'. FIG. 1B and FIG. 1C depict a display 170', whereon is shown the imagery captured by optical acquisition system 90. As such display 170' (as well as display 170) shows the teddy bear object as viewed from different perspectives acquired by system 10. Patterns including first pattern 50-1, and second pattern 50-2, preferably are projected by system 30 in the near IR range so as not to be visible to the human eye. However, for ease of understanding exemplary patterns are shown in FIG. 1B and FIG. 1C as though they were visible to the human eye. In FIG. 1B, pattern 50-1 is shown as a grid of spots, some of which will contribute different disparity information when falling on portions of the imagery more distant from system 30, e.g., dots projected on wall 80, as contrasted to projected dots falling on near surface regions of the teddy bear target object 60. In FIG. 1C a completely different pattern 50-2 has been projected by system 30, here a pattern of lines of various lengths and orientations. In some instances these lines falling upon curved target objects, e.g., head 60, hand 70 may contribute different disparity information pattern lines falling upon a planar surface, e.g., wall 80.

The patterns shown in FIGS. 1B and 1C are intended to depict conceptually how projection of differing first and second patterns enables system 30 to optically acquire parallax and other optical information including disparity information. The patterns depicted are not necessarily real patterns, nor need they be visible to the human eye, only to the camera pixel sensor arrays in optical acquisition system 90. The thus augmented optical information enables processor system 100 to more rapidly and robustly arrive at a more accurate three-dimensional reconstruction image of what is being imaged than if no patterns were used, or only one pattern was used. Consider some exemplary but not exhaustive pattern design considerations. Patterns so designed are useful to more rapidly, robustly, and accurately discern different qualities and characteristics of target objects in an imaged scene. This in turn hastens three-dimensional reconstruction by processor system 100.

In some embodiments pattern generator system 30 may be dynamically optimized to enhance spatial dynamic range, e.g., one pattern, perhaps 50-1, is optimized for target objects, perhaps 60, that are relatively close to system 10, while a second pattern, perhaps 50-2, is optimized for objects that are further away, perhaps wall 80. Such spatial optimization means pattern projection system 30 projects patterns useable by processor system 100 to more rapidly and more accurately assess a three-dimensional depth map (z-map) of the imagery captured by optical acquisition system 90, using disparity and other acquired information, than with other projectable pattern selections.

In some applications, it might be desirable that pattern projection system 30 projects patterns optimized for geometric object recognition, e.g., perhaps pattern 50-3 is optimized for non-planar surfaces, e.g., target objects 60, while another pattern 50-4 is optimized for planar surfaces, e.g., wall 80. For example, assume patterns of dots were projected by pattern projector system 30. Pattern 50-3 might be a dense pattern of small dots of optical energy to improve resolution and edge quality of information acquired by optical acquisition system 90. In other applications, pattern 50-4 might be a less dense pattern of larger dots to ensure a smoother and more accurate estimation of the object plane, including acquiring information to assess planes at a larger slant angle. As used herein, the term slant angle refers to an angle defined between the plane of the sensor array within each camera 90L, 90R and the plane of a particular target object, where optical axis OA in FIG. 1A, FIG. 2A is normal to each sensor array plane, e.g., a slant angle of 90°. For example in FIG. 1A the plane of wall target object 80 is essentially parallel to the sensor array plane in camera 90L or 90R, in which case the slant angle is 0°. The ability to acquire good image data through use of intelligently selected and projected patterns can increase the useable slant angle over which system 10 is useable.

In yet other applications, pattern projection system 30 might be optimized for temporal-spatial (time-space) resolution. One pattern, e.g., pattern 50-n might have a high density locally unique pattern optimized for use with dynamic scenes, e.g., perhaps target objects 60 that are moving or being moved rapidly relative to a typical 30 frame/sec acquisition capture rate commonly used with optical acquisition system 90. Another pattern 50-n+1 might be a lower density locally unique pattern optimized for relatively stationary objects, e.g., target object 80. Such pattern choices here can improve the quality and speed of a segmentation algorithm useable by processor system 100 to generate three-dimensional reconstruction data.

As shown in FIGS. 1A-1C, patterns 50-1, 50-2, . . . 50-n optically output from pattern projection system 30 preferably fall upon at least one target object, e.g., 60, 80 in the imaged scene, e.g., the scene imageable by both cameras 90L, 90R within optical acquisition system 90. Generally, the imageable scene will fall within the intersection of the field of view (FOV) of the cameras 90L, 90R. Cameras 90L, 90R each include a sensor array of rows and columns of detection pixels enabling optical acquisition system 90 to sense and detect light, ambient or otherwise, reflected by the various target objects in the imaged scene, as well as typically near-IR light reflected from the patterns falling upon the imaged scene.

FIG. 1D depicts a depth map showing the surface topology of the Teddy bear target object of FIG. 1A, as acquired by a prior art two-dimensional imaging system that unlike system 10 in FIG. 1A has no pattern projection system. Such prior art systems may be signal-based such as TOF systems and geometric systems using structured light and stereoscopic imagery. While prior art geometric methods can reproduce a three-dimensional model of physical world target objects realistically in terms of object shapes and sizes, the same system may do less well on other shaped imagery, including textureless target images. Although prior art geometric methods may readily be customized for different applications and platforms using commodity hardware, limitations can exist when different type target objects are to be imaged. Thus in FIG. 1D, at best, the depth map indicates that the Teddy bear's nose projects toward the viewer, whereas the ears are farther back, and other body surface regions are inbetween.

FIG. 2A is similar to what was described with respect to FIG. 1A except that device 20 processor system 100 further includes additional gesture recognition software 132-5 to carryout gesture recognition. Gestures are made by the target object, e.g., human 60 or a portion of the target object, e.g., hand 70, and are acquired by optical acquisition system 90 in device 20'. Whereas the embodiment of FIG. 1A was directed primarily to scanning a passive target object 60, the embodiment of FIG. 2A is directed primarily to acquiring and recognizing (e.g., interpreting) gestures made by a typically human target object, 60, 70. Reference numerals in FIG. 2A and indeed the following figures that are the same as reference numerals in FIG. 1A may be assumed to reference the same thing.

FIG. 2B and FIG. 2C depict first and second exemplary patterns generated and projected by pattern projection system 30 in two-dimensional imaging system 10 of FIG. 2A. The generated patterns are shown projected upon target object 70, as though such patterns were visible to the human eye. It is understood, however, that the projected patterns need only be detectable to the sensor arrays in the left and right cameras 90L, 90R in optical acquisition system 90 in FIG. 2A, according to embodiments of the present invention.

FIG. 2D depicts an exemplary pattern emitted by pattern projection system 30 in two-dimensional imaging system 10 in FIG. 2A. The pattern is depicted as a negative, with black and white substituted for each other, for ease of viewing. As can somewhat be perceived from FIG. 2D, the imaged target object 60 of interest human gesturing with one hand.

Figure 3A:
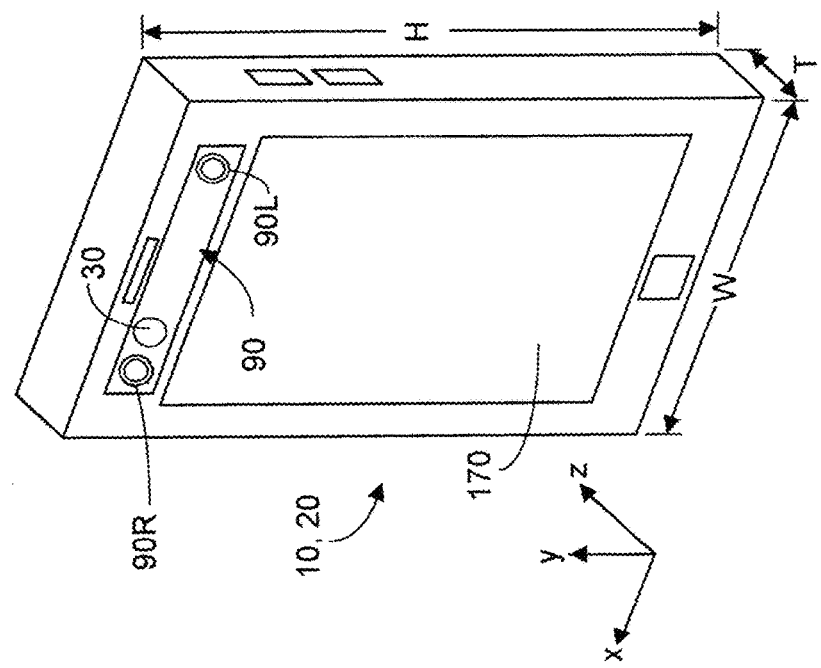
FIG. 3A depicts a two-dimensional imaging system device with an integrated front facing optical acquisition system, according to embodiments of the present invention.

FIG. 3A is a front isometric view of a two-dimensional imaging system 10 device 20 with an integrated front facing optical acquisition system 90, and display 170, while FIG. 3B is a rear isometric view of a two-dimensional imaging system 10 device 20 with an integrated rear facing optical acquisition system 90, according to embodiments of the present invention. If device 20 is cell telephone sized, thickness T may be in the range of perhaps about 2 mm to about 7 mm, with even thinner devices likely in the near future. Exemplary dimensions for W and H might be on the order of 70 mm and 140 mm, respectively.

In FIG. 1A, FIG. 2A, FIG. 3A, and FIG. 3B, it is understood that device 20 is not drawn to scale. In some embodiments device 20 may be as small as a smart cell telephone. Of course device 20 could instead be a larger device, perhaps a netbook or laptop computer. Two-dimensional imaging systems and devices similar to what is shown in FIG. 1A, FIG. 2A, FIG. 3A, and Fig. but without projectable pattern generation, have been developed by Imimtek, Inc., now Aquifi, Inc. of Palo Alto, Calif., and are described in US patents including U.S. Pat. No. 8,723,789, U.S. Pat. No. 8,840,466, U.S. Pat. No. 8,686,943, U.S. Pat. No. 8,773,512, U.S. Pat. No. 8,854,433, and U.S. Pat. No. 8,836,768. U.S. Pat. No. 9,325,973, also assigned by Aquifi, Inc., assignee herein, discloses two-dimensional imaging systems and devices with a two-DOE pattern projection system. These patents describe in far more detail than need be set forth here useful methods and systems to acquire two-dimensional data, including data representing acquired natural user gestures. Applicants herein refer to and incorporate by reference herein the disclosure of these said US patents for their descriptions of acquiring and processing three-dimensional (x,y,z) depth data acquired by a two-dimensional optical acquisition system.

Figure 4A:
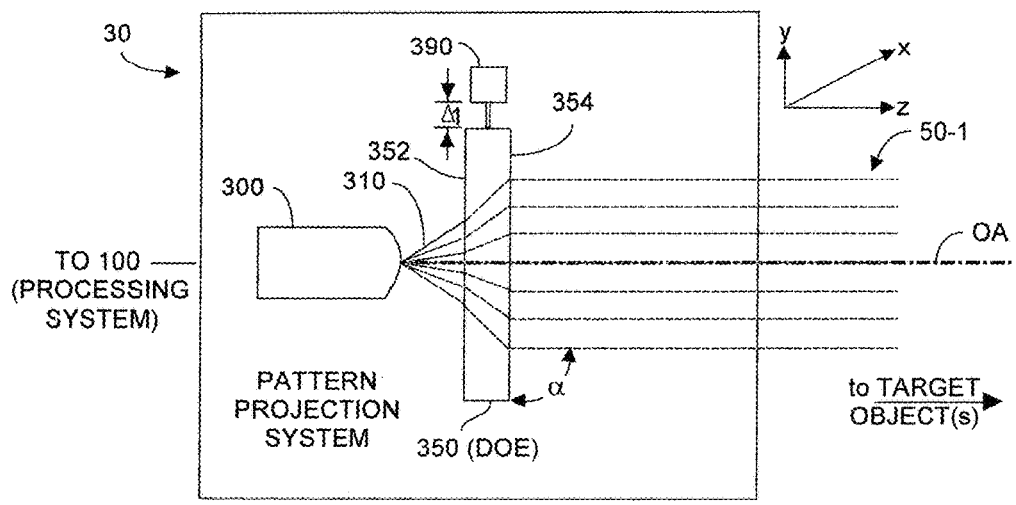
FIG. 4A depicts a pattern projection system using a single DOE coupled to an actuator, which DOE collimates incoming optical energy to generate a first projectable pattern, according to embodiments of the present invention.

FIG. 4A depicts pattern generation system 30, according to embodiments of the present invention. Preferably pattern generation system 30 includes an emitter of optical energy or light source 300, perhaps an LED. Optical energy light rays 310 exiting light source 300 typically is coherent but not collimated. At least some of optical energy 310 is presented to front surface 352 of DOE 350. In some embodiments of the present invention, front surface 352 of DOE 352 serves to expand or spread out income optical energy 310 within the body of DOE 352. Preferably the collimation and pattern generation function occurs at back (or downstream) surface 354 of DOE 350. Thus, as indicated in FIG. 4A, the non-collimated light rays 310 entering DOE 350 become collimated or substantially parallel to each other as they exit rear surface 354 of DOE 350 and include the pattern to be generated, e.g., pattern 50-1 in FIG. 4A. Preferably a mechanical actuator 390 is, coupled to a region of DOE 350 such that the DOE can be configured to move or be repositioned an amount Δ in at least one degree of freedom perpendicular to the optic projection axis OA, and/or rotate the DOE axis OA. In the configuration shown in FIG. 4A, a pattern 50-1 is generated and is projectable along the z-axis, which is also optic axis OA. The thus generated pattern 50-1 projects onto the scene and target objects to be imaged.

Figure 4B:
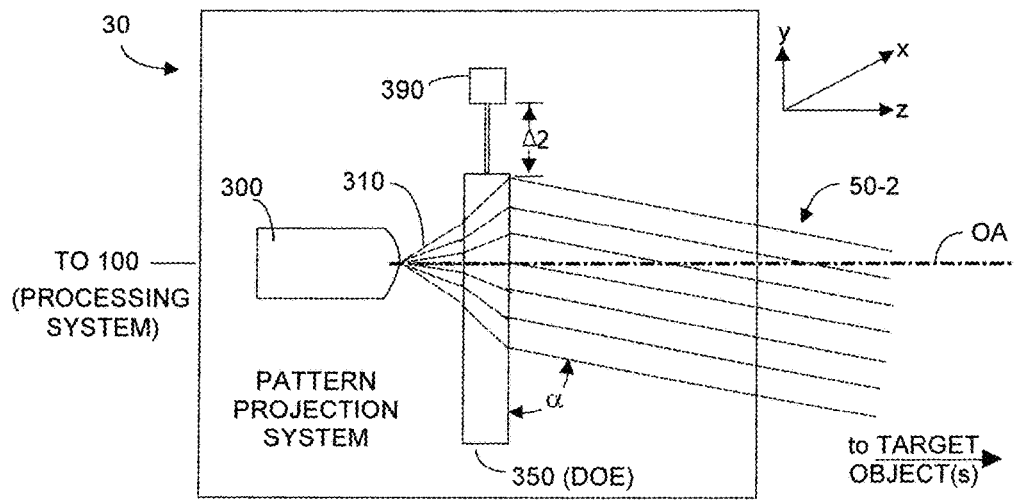
FIG. 4B depicts the pattern projection system of FIG. 4A, where the actuator has repositioned the DOE relative to the optical axis to generate a second projectable pattern, according to embodiments of the present invention.

FIG. 4B is similar to what was depicted in FIG. 4A except that processor 110 executing a routine 132-$n$ stored in memory 120 (not shown) has commanded actuator 390 to physically reposition DOE 350 by an amount Δ2, as contrasted with a reposition amount Δ1 in FIG. 4A, perhaps a few micrometers, e.g., perhaps 15 μm. Correspondingly, a new pattern 50-2 is now generated at DOE 350 rear (or downstream) surface 354, and is projected onto the scene to be imaged. The slight change in actuator induced Δ can cause a measurable change in the generated pattern, perhaps a pattern movement on the order of spacing between adjacent dots or elements in the pattern. In terms of the space-time algorithm, e.g., a routine 132-$n$ stored in memory 120 in processor system 100, the change can be significant.

Although FIG. 4B depicts actuator 390 as having repositioned DOE 350 downward along the y-axis, it is understood that actuator 390 may be reposition DOE 350 in any direction normal to axis OA and/or rotate DOE 350 about the y-axis. For each such reposition, under command of processor 110, a new pattern will be generated from a family of M patterns, and is projected onto the imaged scene. As noted, such actuator-DOE embodiments are a physical implementation of a mathematical shift in the pattern to be generated and projected. A somewhat similar result could occur if the DOE were stationary, but the pattern generator system 30 as a whole, or device 10 as a whole were suitably mechanically shaken. What occurs is that the randomness of undesired speckles in the projected pattern(s) of coherent light is removed, which enhances signal/noise in the quality of the two-dimensional data acquired by optical acquisition system 90, with resultant improvement in the quality of the three-dimensional depth map that is generated. Thus, despeckling of patterns projected using a coherent light source, e.g., 300, is advantageously implemented by embodiments of the present invention.

Figure 4C:
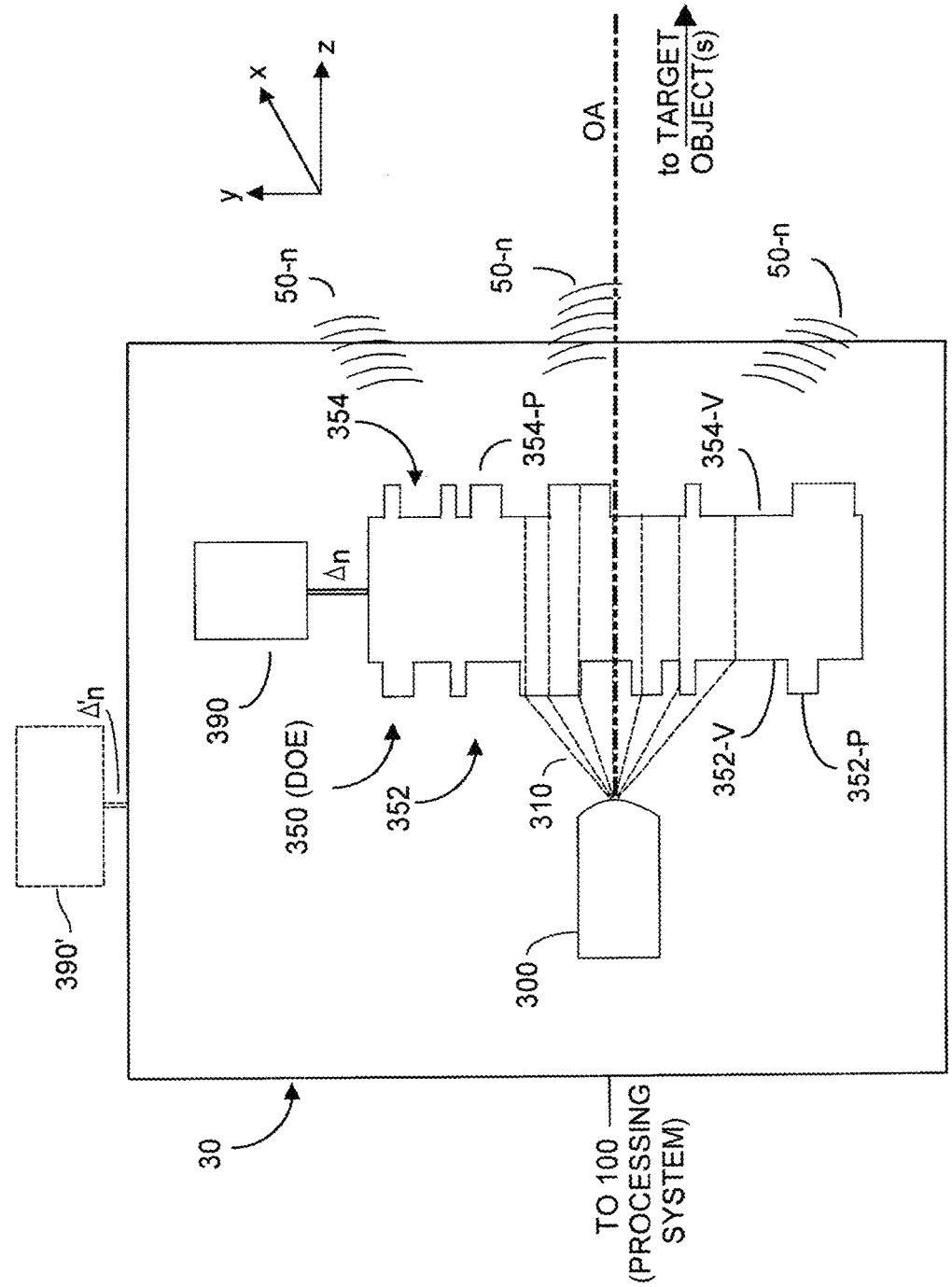
FIG. 4C depicts the pattern projection system of FIG. 4A and FIG. 4B, showing a more detailed view of exemplary surfaces of the DOE, according to embodiments of the present invention.

FIG. 4C depicts pattern generation system 30 similar to what was depicted in FIG. 4A and FIG. 4B, but shows greater detail of surfaces 352 and 354 of DOE 350. In FIG. 4C, which is not to scale, the various plateaus 352-P, 354-P, and valleys 352V, 354V on respective front surface 352 and rear surface 354 are depicted. It can be seen that as actuator 390 displaces DOE 390 normal to optic axis OA, or rotates DOE 390 about optic axis OA, optical energy 310 from light source 300 will interact with different regions of surface 352, and DOE surface 354 will generate a different pattern, 50-$n$, emitted or projected from surface 354. The term hybrid optical element (HOE) may be used to describe a DOE 350, that can perform the function of light collimation and/or pattern generation, when presented with incoming optical energy 310 that is coherent, but not collimated. However, embodiments of the present invention could also be implemented with a DOE that generates the patterns, but is presented with incoming coherent optical energy that is already collimated. Methods and devices for collimating incoming coherent optical energy are known in the art.

The role of actuator 390 has been described with respect to FIG. 4A, FIG. 4B, and FIG. 4C. In preferred embodiments of the present invention, actuator 390 is an electromechanical device coupled to DOE 360 to perform optical transformation operations such as translations and rotations of the DOE relative to optic axis OA. In FIG. 4A, FIG. 4B, FIG. 4C actuator 390, for ease of illustration is shown as translating DOE 350 in the (x,y) plane, along the x-axis, or along the y-axis, or some combination of each. Depending upon its configuration, an actuator 390 could instead, or in addition to (x,y) plane displacement, rotate DOE 350 about the z-axis (or optic axis OA). In some embodiments actuator 390 includes at least one miniature voice coil, such as are commonly used to focus and provide optical image stabilization in miniature camera modules. In other embodiments, actuator 390 may be a piezoelectric device, configured to implement similar actuation of DOE 350. While FIG. 4A, FIG. 4B, FIG. 4C depict actuator 390 mechanically coupled to DOE 350, it is understood that a suitable actuator 390' could instead be mechanically coupled to the entire pattern projection system 30, such as shown by FIG. 4C. If actuator 90' were present, then actuator 90 would be unnecessary.

Generation of a current pattern under command of processing system 100 may intelligently take into account what pattern(s) were previously generated, and also take into account the nature and quality of three-dimensional reconstruction using various of those previously generated and projected patterns. In this fashion, processor system 100 can intelligently determine a relatively optimized pattern to be generated for a current frame ($\Delta t_i$) time of acquisition of optical information by optical acquisition system 90, and can command actuator 390 (or 390') accordingly. In some applications, pattern projection system 30 might be optimized for spatial-temporal or space-time resolution. One pattern, e.g., pattern 50-$n$ might have a high density locally unique pattern optimized for use with dynamic scenes, e.g., perhaps target objects 60 that are moving or being moved rapidly relative to a typical 30 frame/sec acquisition capture rate commonly used with optical acquisition system 90. Another pattern 50-$n$+1 might be a lower density locally unique pattern optimized for relatively stationary objects, e.g., target object 80. Such pattern choices can improve the quality and speed of a segmentation algorithm useable by processor system 100 to generate three-dimensional reconstruction data. Such algorithms 132-$n$. 132-$x$, etc. are preferably stored in memory 120 and are executable by processor 110, within processor system 100 (see FIG. 1A).

In some embodiments, pattern generator system 30 may be dynamically optimized by processor system 100 to enhance spatial dynamic range. Perhaps a first pattern 50-1 is optimized for target object such as 60 that are relatively close to system 10, while a second pattern 50-2, is optimized for objects that are further away, perhaps wall 80. Such spatial optimization means pattern projection system 30 projects patterns useable by processor system 100 to more rapidly and more accurately assess a three-dimensional depth map (z-map) of the imagery captured by optical acquisition system 90, using disparity and other acquired information, than with other projectable pattern selections.

In some applications, it might be desirable that pattern projection system 30 projects patterns optimized for geometric object recognition, e.g., perhaps pattern 50-3 is optimized for non-planar surfaces, e.g., target objects 60, while another pattern 50-4 is optimized for planar surfaces, e.g., wall 80. For example, assume patterns of dots were projected by pattern projector system 30. Pattern 50-3 might be a dense pattern of small dots of optical energy to improve resolution and edge quality of information acquired by optical acquisition system 90. In other applications, pattern 50-4 might be a less dense pattern of larger dots to ensure a smoother and more accurate estimation of the object plane, including acquiring information to assess planes at a larger slant angle.

For ease of description, optical acquisition system 90 will be described in the context of only two cameras, 90L (left) and 90R (right). Consider the estimated depth or disparity map obtained, for example, from camera 90L, although in this description, 90L and 90R are interchangeable, and could be disposed at top and bottom positions, rather than left and right positions in device 20 (see FIG. 1A).

In two-dimensional imaging systems characterized by two or more two-dimensional cameras, depth estimation is carried out analogously to standard stereoscopic systems having two mechanically rigidly-linked calibrated cameras. Camera calibration information provides the necessary information to rectify input images so that corresponding epipolar lines between images captured by the two cameras (e.g., the left and right views) are aligned. In such case, a three-dimensional point in the scene imaged by the two cameras is projected onto different portions of the left and right images and the distance between the locations of the projections of the three-dimensional points is referred to as the disparity (d). A description of the use of epipolar lines and image rectification may be found in U.S. Pat. No. 8,686,943 entitled Two-Dimensional Method and System Enabling Three-Dimensional User Interaction With a Device (2014), assigned to Aquifi, Inc., assignee herein.

Stereoscopic algorithms exploit this property to perform three-dimensional reconstruction by matching points between left camera and right camera image acquisitions, which is equivalent to estimating disparities. Block matching (BM) is a commonly used stereoscopic algorithm, e.g., software 132-$n$ stored in memory 120 in processor system 100. In block matching, given a pixel in the image array in the view acquired by left camera 90L, a BM algorithm computes, for all disparities, the cost to match the pixel to a corresponding pixel in the view acquired by right-camera 90R. The cost function (CF) is defined as similarity between the windows surrounding the prospective matches. Optimal disparity at the point is finally estimated as the disparity that maximizes the similarity between the windows in the left and the right camera acquired image views. This optimal transformation procedure is commonly addressed as Winner-Takes-All (WTA). BM-type stereo algorithms, e.g., routines among those routines 120-$n$ stored in memory 120, rely on appearance similarity, and thus require the imaged scene to be textured so an adequate number of image points in the optically acquired imagery can confidently be matched across acquired views. Consequently, BM-type stereo algorithms provide inaccurate disparity estimates at points located in imaged regions that are textureless, or are poorly textured, or have repeated identical textures.

This image scene texture limitation is overcome by providing a two-dimensional imaging system with a pattern projection system, according to embodiments of the present invention. Pattern projection system 30 preferably generates and projects appropriate pattern or patterns, some of which optically present an impression of texture in the scene to be imaged. The pattern projection system creates and projects onto the scene to be optically imaged collimated light patterns of brightly illuminated dots or lit points. Projecting such patterns can enhance overall system/noise for the optical acquisition system and processing system, to yield more reliable (x,y,z) image map data, over longer distances between the two-dimensional imaging system and the imaged scene including any target objects therein. In addition to generating and projecting at least first and second patterns, embodiments of the present invention also can help despeckle the optically acquired images, including the projected patterns. As noted, speckling is an undesired artifact resulting from the use of a coherent light source 300 in pattern projection system 30.

While customized projection patterns can offer improvements over comparative textured projections, in either method certain areas of the imaged scene may receive limited or no illumination from the pattern projection system. For example, using customized dot patterns, light energy from the optical energy source is concentrated in the projected spots and not in the space between the spots. Therefore, areas in the imaged scene in which there are no projected dots do not receive any projected illumination. When using textured projections, different areas of the projection should have different intensities to provide detectable texture. Inevitably, due to noise, certain areas in the imaged scene will be dimmer or even invisible to the optical acquisition system. Moreover, when projecting either a customized dot pattern or a projected texture pattern, the amount of local information (e.g., the local configuration of a pattern) carries the information that is usable for correspondence matching purposes, according to embodiments of the present invention.

In preferred embodiments, local configuration of the pattern or texture is evaluated within the considered matching block, in which case matching block size is an important parameter in the design of a two-camera optical acquisition system, or stereo vision system. For example, bigger matching blocks are characterized by higher local configuration information, while smaller matching blocks lead to better performance on the lateral granularity of the depth map estimated by the stereo vision system (a stereo vision system may, be characterized by a lateral resolution on the order of the size of half a block). In the case of systems using an auxiliary projector, the size of the matching block is strictly related to the amount of information that the pattern provides within the block itself. It can be shown empirically that, for a dot pattern, there needs to be approximately four dots within a block to obtain reliable matches. Depending on density of the dots, it is possible to find the size of a block that leads to an average number of four dots within a block. However there is a limit to the number of dots that can be resolved by the optical acquisition system cameras, e.g., due to point-spread effects of the camera lens. Thus there is a practical limit to density of the dots in the pattern to be projected, which in turn may set a lower limit on the block size. For example if cameras 90L, 90R have VGA pixel sensor arrays, it is possible to project a pattern with approximately 10% lit dots. This leads to a matching block size of about 15×15 pixels, which means the optical acquisition system will have a lateral resolution of approximately 7 pixels.

Analysis of a textured pattern is somewhat more difficult, but similar considerations on the lateral resolution of the system apply to comparative systems using a textured pattern. Consider space-time methods in using customized or optimized projection patterns to assist the three-dimensional reconstruction process executed by processor system 100. Different projection patterns may be designed and generated based on general properties of the scene being imaged. The design and generation process will subsequently use information acquired of the scene, based on multiple different projection patterns In some embodiments, information gained from sensing the present and perhaps past projection patterns may be used to intelligently select for generation a suitable subsequent projection pattern to maximize information gain or the expectation thereof in the next frame.

There is a general class of stereoscopic three-dimensional reconstruction algorithms that employ a series of projection patterns in successive frame acquisitions and combine such information to perform three-dimensional reconstruction. One can show that such algorithms offer superior performance compared to static projection schemes. For example, such algorithms can seamlessly and automatically transition between very high fidelity three-dimensional reconstruction for static scenes where quality is the highest priority, and very low latency reconstruction for dynamic scenes where speed is more important. Furthermore, such transition may occur locally, meaning that for static parts or objects in a scene, high fidelity data is produced, albeit with some latency, while for the dynamic objects in the same scene, low latency data is produced, albeit at lower fidelity.

This class of algorithms is often referred to as space-time as the algorithms, use information within spatial and temporal neighborhoods of the acquisition points in optically acquired images to reconstruct (x,y,z) coordinates of those points in space at a particular time. The term space-time has also been used in a more specific technical sense as it refers to a particular extension of the stereo block-matching algorithm, as described in Rapid Shape Acquisition Using Color Structured-Light and Multi-Pass Dynamic Programming by Zhang, Curless, and Seitz. See also Spacetime Stereo: A Unifying Framework for Depth from Triangulation by Davis, Ramamoorthi, and Rusinkiewicz. These two references are incorporated herein by reference. As used herein, the term space-time refers to the general family of algorithms having the above-mentioned property. As such, this is inapposite to the latter specific extensions of the stereo block-matching algorithm described in Li and Davis.

The series of projection patterns used for the space-time methods may be related hierarchically, topologically, or may be completely unrelated to one another. As such, comparative existing space-time methods rely on general-purpose projection systems that can produce arbitrary projection patterns. (see, e.g., Lee, referenced above) The optical source in such systems may be light emitting diodes (LED), or digital light projection (DLP) projector devices, although DLP devices are too physically, consume too much operating power, and are too expensive to be employed as a light source in a battery operated, portable system 10 such as shown in FIG. 1A, or even in larger devices such as laptops, tablets, PDAs and the like.

As noted, embodiments of the present invention provide compact and inexpensive systems that intelligently project patterns selected from a related family set M of patterns, to realize the advantages of space-time depth reconstruction techniques while maintaining a small size, low power, and low cost. In some embodiments, the family of patterns may be related to one another by an angular translation operator such as a direction cosine translation transform or rotation transform. The translation operator is derived based on the design of the projection system taking into account manufacturability constraints. This family of patterns is then customized or optimized as a whole with respect to criteria described below, while taking into account the translation operator that relates the patterns.

By way of overview, optical acquisition system 90 acquires (x,y) image data at a frame rate having a frame period $\Delta_r$. For every time interval $\Delta t_i$ for which a depth frame is to be generated, processor system 100 causes an algorithm, e.g., 132-n stored in memory 120 to command pattern projection system 30 to generate one member of the family of patterns $\mathcal{M}$. Two-dimensional data acquired by optical acquisition system 90 then uses the projected pattern in acquiring the next frame of (x,y) data, which data is used by processor system 100 to generate a three-dimensional depth map. In various embodiments, the pattern generation method may use information acquired from previous frames $\Delta t_j$, j<i during which different members of $\mathcal{M}$ were used. If desired, processor system 100 may also or instead use past information to select or otherwise generate a subsequent projection pattern that can provide maximal depth information in the subsequent frames of optically acquired data.

One may model the pattern transformation effect of a mechanical actuator such as actuator 390 on pattern projection system 30 (see FIG. 4A, FIG. 4B, FIG. 4C). For example, optical acquisition system 90 preferably employs two spaced-apart two-dimensional cameras 90L, 90R, e.g., two VGA cameras operable in the IR spectrum. Preferably cameras 90L, 90R are rigidly connected together mechanically with respect to each other's location, and are fixed relative to pattern projection system 30. Projector system 30 includes (DOE) 350, having front and rear surfaces 353, 354 respectively, that implements collimation and pattern generation functions, a near-infrared laser diode optical source 300 having an emitter propagation axis that is aligned with (e.g., parallel to) optical axis OA for DOE 300 and pattern projection system 30. As shown in FIG. 4A, FIG. 4B, FIG. 4C, pattern projection system 30 preferably further includes at least one mechanical actuator 390 (or 390') that can move (translate) DOE 350 in any degree of freedom including rotation normal to optical axis OA. For example, as depicted in the figures, the optical axis OA extends along the z axis and the mechanical actuator 700 translates the DOE along the x-y plane by a few micrometers. In FIG. 4B the diffractive optical element 600 is at a first position relative to the light emitter 500 and in FIG. 4C the optical element is at a second position relative to the light emitter. The slight change (e.g., 15 micrometers for the VGA system described above) in position of the diffractive optical element 600 between the first position and the second position causes the pattern emitted by the system to change measurably and effectively as concerns the space-time algorithm (e.g. the pattern moves on the order of the spacing between the dots), as described in more detail below.

In the scalar optics regime, a translation dx of the DOE with effective focal length $f_{EFL}$, results in a holographic shift of:

$$d\alpha \approx \sin\left(\operatorname{atan}\left(\frac{dx}{f_{EFL}}\right)\right)$$

where dα is the holographic order shift.

The original projection pattern before transformation may be described as a collection of light source illuminated or lit points in the holographic grid:

$$S_0 = \{(\alpha_i, \beta_i, I_i) | 1 < i < N\}$$

where $\alpha_i$ and $\beta_i$ are direction cosines in the X and Y directions respectively of the i-th point, $I_i$ is the intensity of the i-th point and N is the total number of lit points.

Once projected on a flat surface normal to the projection axis and at distance $Z=z_0$, the Cartesian coordinates and intensity of the dots in the pattern $S_0$ are given by:

$$S_0 = \left\{ \left( \frac{z_0 \alpha_i}{\sqrt{1 - \alpha_i^2 - \beta_i^2}}, \frac{z_0 \beta_i}{\sqrt{1 - \alpha_i^2 - \beta_i^2}}, z_0, I_i \right) | 1 < i < N \right\}$$

The transformed pattern $S_1$ of is given by:

$$S_1 = \{(\alpha_i + d\alpha, \beta_i, I_i) | 1 < i < N\}$$

in the holographic grid, and $$S_1 = \left\{ \left( \frac{z_0(\alpha_i - d\alpha)}{\sqrt{1 - (\alpha_i - d\alpha)^2 - \beta_i^2}}, \frac{z_0 \beta_i}{\sqrt{1 - (\alpha_i - d\alpha)^2 - \beta_i^2}}, z_0, I_i \right) | 1 < i < N \right\}$$

in the Cartesian grid. If dx is small compared to $f_{EFL}$ such that:

$$d\alpha \approx \frac{\sin(\alpha_{max})}{M_X}$$

where $\alpha_{max}$ is the maximum deflection angle and $M_X$ the number of holographic orders in the X direction respectively, the above transformation can be approximated as:

$$S_1 \approx \left\{ \left( \frac{z_0 \alpha_i}{\sqrt{1 - \alpha_i^2 - \beta_i^2}} - \frac{z_0}{f_{EFL}} dx, \frac{z_0 \beta_i}{\sqrt{1 - \alpha_i^2 - \beta_i^2}}, z_0, I_i \right) | 1 < i < N \right\}$$

The original and transformed patterns as imaged by a pinhole camera model will be given by:

$$P_0 = \left\{ \left( \frac{f \alpha_i}{\sqrt{1 - \alpha_i^2 - \beta_i^2}}, \frac{f \beta_i}{\sqrt{1 - \alpha_i^2 - \beta_i^2}}, I_i \right) | 1 < i < N \right\}$$

and $$P_1 \approx \left\{ \left( \frac{f \alpha_i}{\sqrt{1 - \alpha_i^2 - \beta_i^2}} - \frac{f}{f_{EFL}} dx, \frac{f \beta_i}{\sqrt{1 - \alpha_i^2 - \beta_i^2}}, I_i \right) | 1 < i < N \right\}$$

where f is the focal length of the pinhole camera.

Therefore, for a camera with a pixel array pixel pitch of $p_x$ in the x direction, translation of the DOE by dx approximately results in a shift of the pattern (in pixels) by:

$$d_{p_x} = \frac{f}{f_{EFL}} \frac{dx}{p_x}$$

Consider now an exemplary parameter set derived from an actual embodiment of the present invention, using space-time stereo vision algorithms, such as an algorithm 132-n in FIG. 1A. For a stereo vision system such as shown in FIG. 1A, one can introduce the concept of Cost Volume (CV), a three-dimensional cuboid constructed by having one element for each pixel in the image acquired by left camera 90L in FIG. 1A, and by each disparity value in the disparity range. For each pixel and each disparity value, the cost volume CV stores the value of the matching cost function. This cost function is computed by evaluating similarity of the optic images acquired by left and right cameras 90L, 90R in the pixel itself and in the pixel obtained by applying horizontal translation of the value of the considered disparity. The value of the matching cost function is generally obtained for stereo systems by computing a dissimilarity metric, e.g., the Sum of Absolute Differences (SAD), within the considered window. As noted, the estimated disparity value can be obtained for each pixel as the one for which there is a global minimum in the range of disparities (winner takes all or WTA).

The above described exemplary use of SAD and WTA is given for ease of explanation and for reference. Those skilled in the art of stereo vision systems will recognize that combining SAD and WTA is but one of many methods of stereo vision algorithms 132-n that may be used in this context. Without limitation, other exemplary methods of stereo vision algorithms may include semi-global or global methods, e.g., Scharstein, D. and R. Szeliski, A Taxonomy and Evaluation of Dense Two-Frame Stereo Correspondence Algorithms, International Journal of Computer Vision, 2002. 47(1-3): p. 7-42.

The same cost volume concept can be applied in space-time stereo vision embodiments of the present invention. For example, in standard stereo vision algorithms, cost volume (CV) typically is reset at each frame of data. However for space-time stereo algorithms, one can consider the concept of cost volume per frame, and also the sum of cost volumes for multiple frames, each with its distinct pattern within the family of projected patterns. Consider the example of a cost volume CV1 for a first frame, and cost volume CV2 computed for a following second frame of data acquired by optical acquisition system 90. For active stereo systems characterized by a static projector system, if the acquired frame of image scene does not substantially change between first and second frames, then CV1 and CV2 are substantially the same, perhaps with slight variation induced due to noise sources such as imaging sensor array thermal noise, Poisson shot noise, pixel readout analog amplifier noise, analog-to-digital conversion quantization noise, and other thermal sources of noise. Therefore, summing CV1 and CV2 does not produce any specific benefit, since argmin of f(x) and 2·f(x) is the same. If, however, the system mode is space-time stereo and first and second different patterns are projected at the first and the second frame, CV1 and CV2 will not be similar. Consequently, one can show the sum of CV1 and CV2 leads to more pronounced minima, which allows the system to obtain better performance with respect to the process of estimating the (x,y,z) depth map.

Figure 5B:
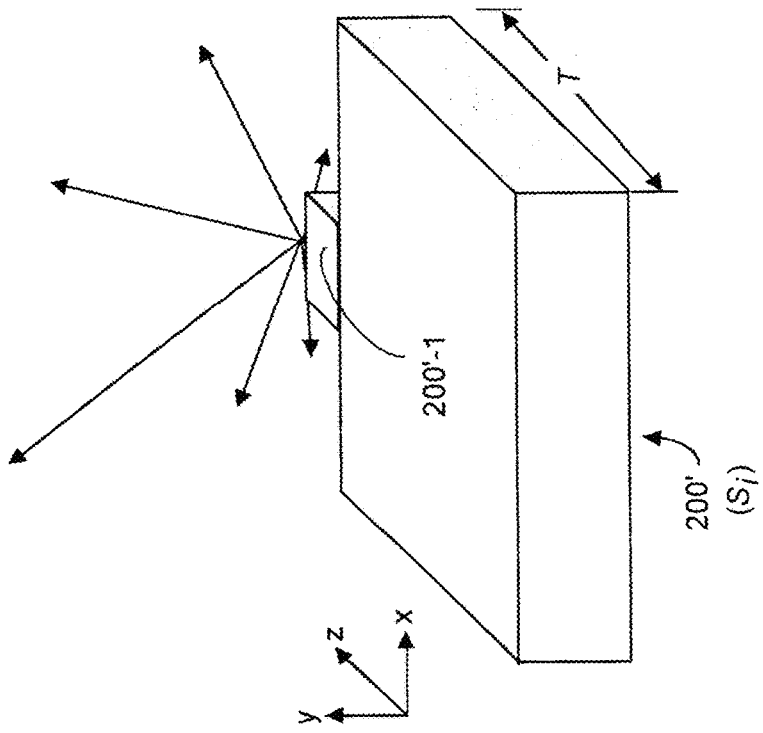
FIG. 5B is an isometric view of a packaged light emitter component $S_P$, according to preferred embodiments of the present invention.
Figure 5A:
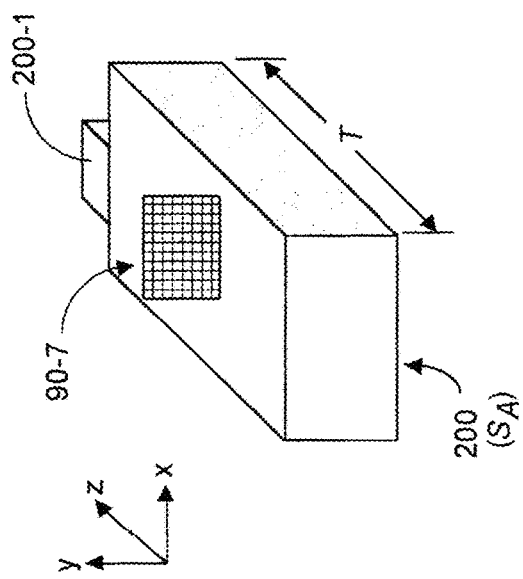
FIG. 5A is an isometric view of a packaged image acquisition component $S_A$, according to embodiments of the present invention.

FIG. 5A is an isometric view of a packaged image acquisition component $S_A$, 200, in optical acquisition system 90. In FIG. 5A 200-1 denotes the lens or imaging optics on camera 90L or 90R. Image array 90-7 of say camera 90L or 90R is also shown. It is understood that incoming optical energy reflected off the imaged scene, including perhaps target object(s) 60, 80 (see FIG. 1A), passes through lens 200-1 and falls upon array 90-7 in camera 90L or 90R, to produce a two-dimensional (x,y) image of the scene, including target object(s) and projected pattern(s). T denotes the thickness of image acquisition component 200, e.g., about 3 mm to about 5 mm. As described herein, incoming optical energy passes through optics 200-1 associated with camera 90L, or 90R, (200 in FIG. 5A) and falls upon image array 90-1, to produce thereon a two-dimensional image. Exemplary cameras 90L, 90R might be model no. LI-2M05CM produced by Leopard Imaging Inc.

FIG. 5B is an isometric view of a packaged coherent pattern emitter module $S_f$, 200', e.g. such as that shown FIG. 4C. As noted elsewhere herein, optical energy, emanating from source 300 is coherent but uncollimated. In FIG. 5B element 200'-1 is a projection optics DOE 350 associated with emitter 300, the output from which is depicted as radiating vectors in FIG. 5B. As noted elsewhere herein, these emanations are presented to first surface 352 of DOE 350, and become spread out, and exit second surface 354 of DOE 350 as collimated rays of light with projectable pattern(s). T is thickness of the light source, typically about 3 mm to about 5 mm. In many applications, the thickness T of the packaged active illumination component $S_f$, is a limiting factor in the overall thickness of optical acquisition system 90. As such, reducing thickness T of $S_f$, can reduce overall thickness of the entire optical acquisition system 30.

Figure 6A:
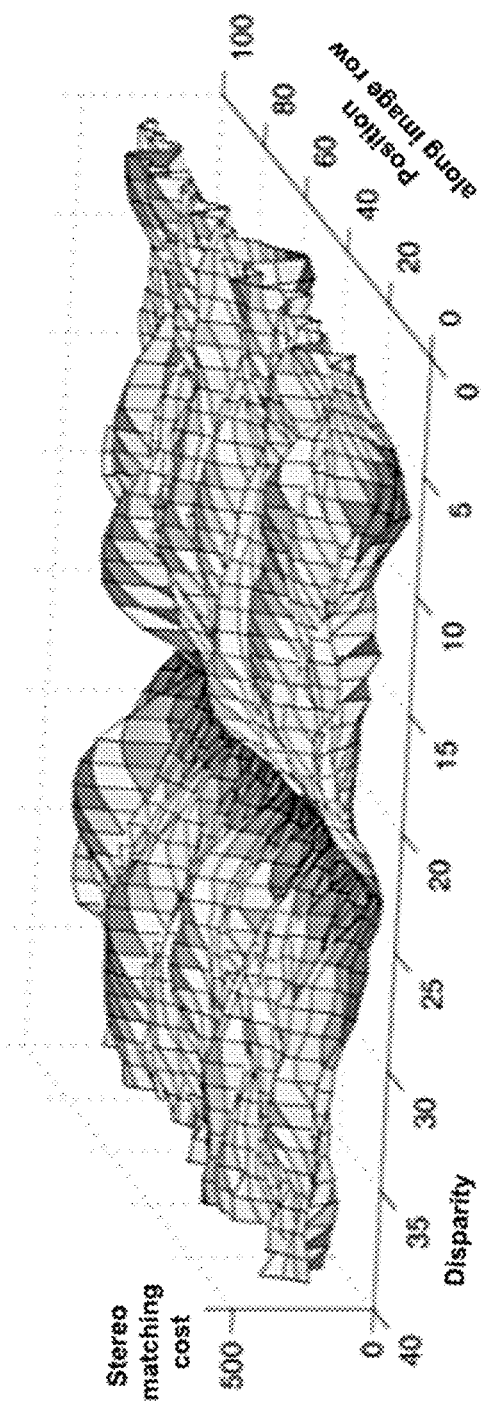
FIG. 6A depicts an exemplary slice of a cost volume for a single projected pattern, according to embodiments of the present invention.
Figure 6B:
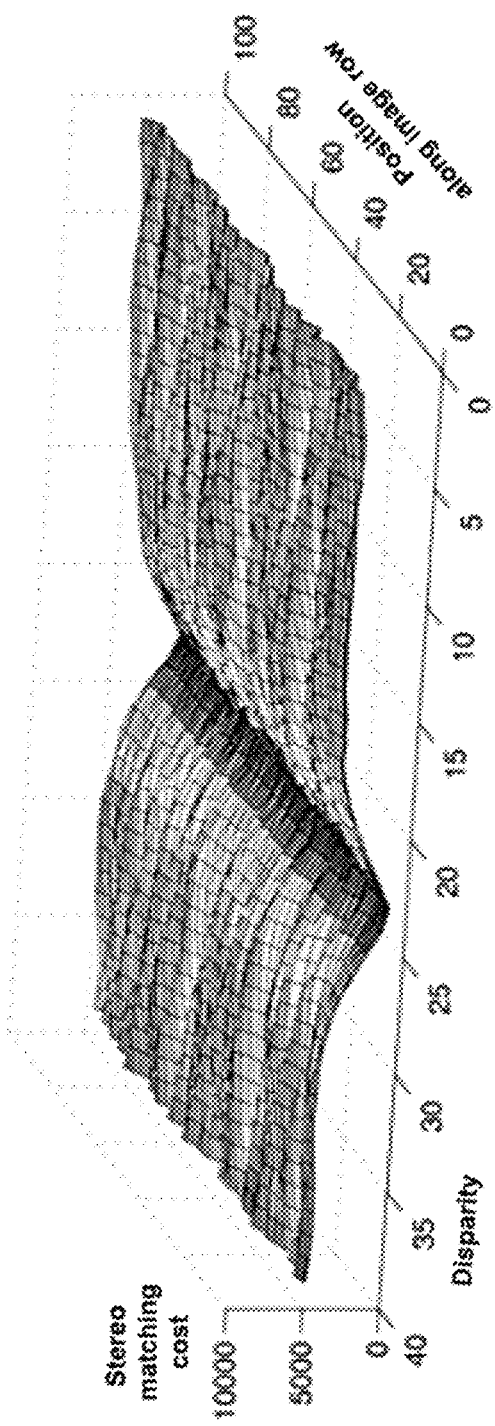
FIG. 6B depicts an exemplary slice of a cost volume for multiple projection patterns, according to embodiments of the present invention.

FIG. 6A depicts an example of a slice of a cost volume (CV) for the case of a single projected pattern. FIG. 6B is an example of a slice of a cost volume for the case of multiple projected patterns for the case where the depth sensor is pointed at a parallel target plane. In FIG. 6A and FIG. 6B, the vertical axis is the stereo matching cost, the horizontal axis is disparity, and the depth of the figures represents pixel position along an image row, within pixel sensor array 90-7 (see FIG. 5A) in camera 90L or camera 90R in optical acquisition system 90. Ideally, the minima of the disparity matching cost should occur at the same disparity value along the image row, since the target plane is parallel to the sensor. Note in FIG. 6A that the value of the matching cost function is substantially noisier than the substantially more pronounced minimum for the multiple pattern case of FIG. 6B.

As an alternative view of the algorithm, one may consider space-time stereo algorithms as being stereo algorithms that aggregate information on a three-dimensional matching window instead of a two-dimensional matching window used for standard stereo algorithms. The third dimension in this case can be obtained by stacking the input images, one atop the other.

The cost volume CV containing the integration of different cost volumes in time can be bootstrapped by adding to the CV the cost of the match between the difference of the first frame and of the second frame of optical acquisition system acquired data. Another useful property of space-time algorithms is the permissible shrinking of the matching window, as previously described. What matters is the number of elements in the matching cuboid, rather than the length of the different sides. However this is only true in the case of different projected patterns in different frames.

The described procedure can be extended to the case of using more than two acquisition frames to provide successive frame acquisitions, where acquisitions are performed in relatively quick succession compared to motion of the imaged scene or of optical acquisition system 90. Stated differently, the imaged scene should not change substantially between the multiple frame acquisitions.

Space-time stereo methodology advantageously can benefit from specific properties of the projected patterns. For example, consider the case where the patterns projected at two consecutive frames (although this methodology is not limited to two frames only) can be obtained from each other by applying a rotation and/or a translation of the patterns, when such rotation and/or translation transformation is actually known by the algorithm. Such knowledge can be implemented by time-calibrating and synchronizing pattern projection system 30 and cameras 90L, 90R in optical acquisition system 90. In this case, the algorithm, e.g., 132-*x* (see FIG. 1A), can exploit such information to enhance quality of the estimated (x,y,z) depth information, and to improve speed of the depth estimation process. Consider the following exemplary methodologies.

During one frame of acquired data, algorithm 132-*x* can estimate the depth map of the imaged scene by providing a stereo depth estimation hypothesis. Thus during frame 1 a first pattern 1 (perhaps pattern 50-1) is projected. This hypothesis assumed to be valid for the following frame 2, in which an altered pattern 2 (perhaps pattern 50-2) is projected onto the imaged scene, where pattern 2 is obtained by translation and/or rotation of pattern 1 (e.g., 50-1). Given a set of depth hypotheses, a refinement is performed by cross-checking the previously estimated depth map (now the depth hypothesis) against the newly acquired frames, to obtain a refined depth estimation. In this refined estimation, the depth values agree with the depth estimates across the various controlled transformations of the pattern.

Figure 7:
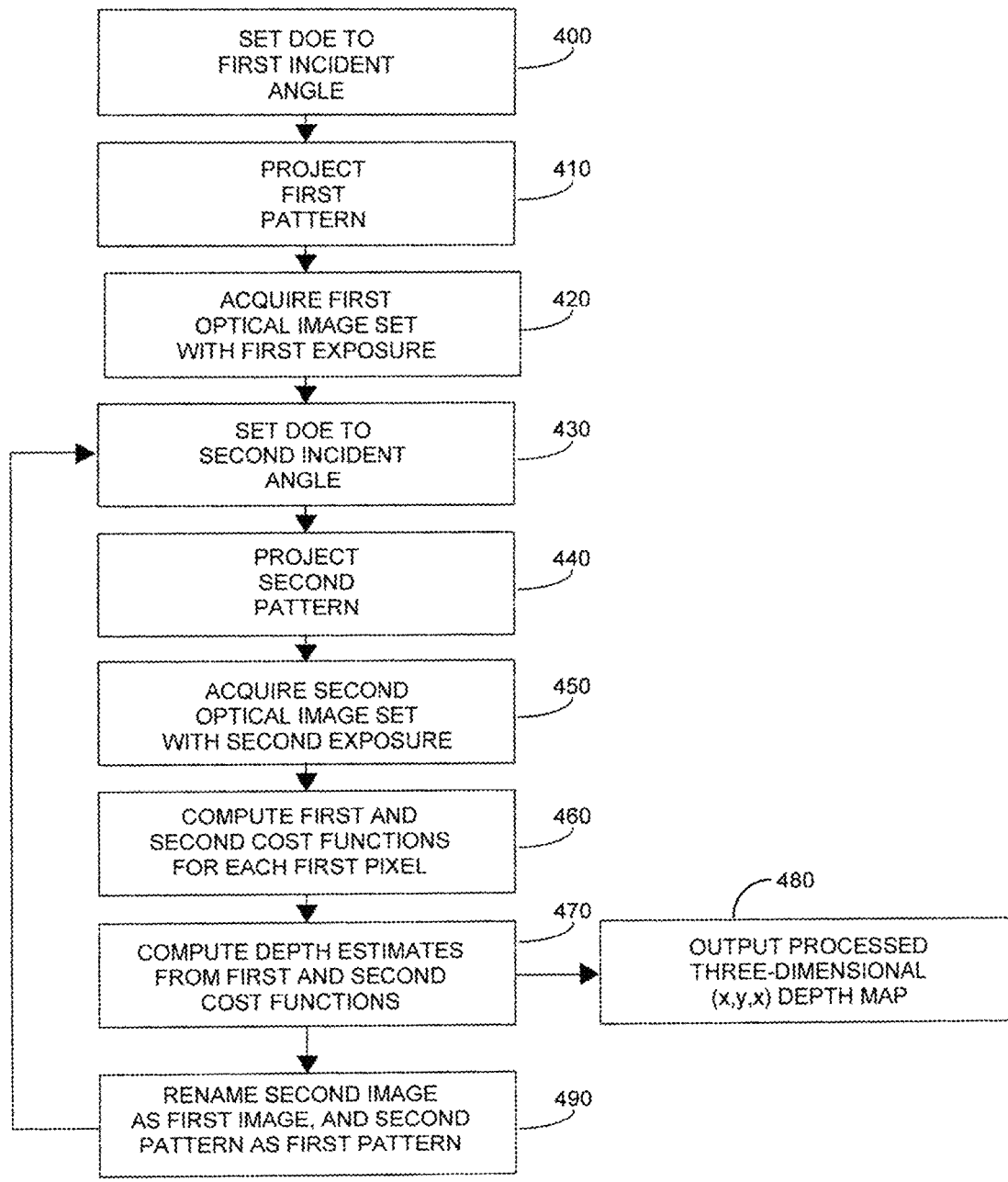
FIG. 7 is a flowchart depicting exemplary method steps for an algorithm performing space-time stereo depth reconstruction, according to embodiments of the present invention.

Additionally, according to some embodiments of the present invention, the relative motion assumption is made less strict. The can be done by considering an adaptive matching cuboid that expands its temporal side in the case of static imaged scenes, and expands the non-temporal sides in the case of dynamic imaged scenes. Motion analysis in the acquired scene can be performed locally for each pixel (e.g., at least in a region surrounding a pixel) in the pixel array of each camera, e.g., 90L, 90R. This can be done, for example, using an optical flow algorithm, e.g., routine 132-*n* in FIG. 1A. FIG. 7 is a flowchart depicting exemplary steps in a general case of such an algorithm, according to embodiments of the present invention.

In FIG. 7, at step 400 processor 110 executes an algorithm, e.g., 132-*n*, stored in memory 120 (see FIG. 1A) to cause actuator 390 or perhaps 390' (see FIG. 4A) to mechanically set DOE 350 for a first incident angle α, where α is the angle between second DOE surface 354 and the imaginary line connecting the optical center of the DOE lensing function to the emission point of the coherent light source 300. In FIG. 4A, incident angle α is 90°, whereas in FIG. 4B incident angle α is somewhat less than 90°. At step 410, pattern projector system 30 projects a first pattern 50-1 onto the imaged scene. At step 420, optical acquisition system 90 acquires a first set of (x,y) data from the imaged scene with the first projected pattern during a first acquisition frame time $t_1$, e.g., 33.3 ms. At step 430, processor 110 and algorithm 132-*n* cause actuator 390 to mechanically set DOE 350 to a second incident angle α as shown on FIG. 4B, and at step 440, pattern projector system 30 projects a second pattern 50-2 onto the imaged scene. At step 450 optical acquisition system 90 acquires a second set of (x,y) data from the imaged scene, now with the second projected pattern. At method step 460, processor 110 and algorithm 132-*n* compute first and second cost functions for each first pixel in the first and second acquired (x,y) image data. At step 470, (x,y,z) depth estimates are calculated for the first and second cost functions. At method step 480, resultant present (x,y,z) depth map data is available for output. At method step 490, the processor and executed algorithm rename the second image (image 2) as image 1, and rename the second pattern (pattern 2) as pattern 1, and the process branches back to method step 430. The process is now continued for a third frame of image data acquired using a third projected pattern, which third image (image 3) data and third projected pattern (pattern 3) are denoted now as image 2, pattern 2, according to the nomenclature of FIG. 7. In this fashion the routine continues and updates, as deemed necessary, the next pattern to be generated and projected. The next pattern is commanded by processor system 100 commanding actuator 390 (or 390') to reposition DOE 350 a desired Δ amount. In some embodiments, memory 120 may include a look-up-table that correlates various actuator 390 (390') Δ amounts with pattern types to be generated and projected.

Exemplary customization and optimization of space-time projection patterns will now be described, according to embodiments of the present invention. A family M of patterns that can be generated and projected using the above-described methodology may be customized or optimized. In some embodiments a single member of the pattern family can be used as a single projected pattern. For example, when multiple members of the family are projected in subsequent separate image acquisition frames, (x,y) data information acquired from the different acquisitions can be fused together and exploited in a joint fashion to yield enhanced (x,y,z) depth estimates during stereoscopic three-dimensional reconstruction.

In the case of depth reconstruction, patterns are usually designed so cost computed via block-matching (BM) will have a single minimum in the range of disparities in the expected working environment. As such the size of the range of disparities determines the minimum horizontal periodicity of the pattern itself. The size of block-for-block matching determines maximum possible periodicity in the pattern. Preferably minimum required periodicity from disparity range constraints and maximum possible periodicity from block-size constraints should coincide or at least be substantially very similar for an efficient pattern. Size of the selected block determines spatial resolution of the estimated depth map. Thus in embodiments of the present invention, the pattern can be customized by selecting minimum block size that leads to unique matches for the designed range of disparities. The associated analyses and pattern determination decisions are preferably made by processor 110 executing software including software 132-n, and commanding actuator 390 to position or reposition DOE as required to yield a desired pattern at a given frame time.

Figure 8:
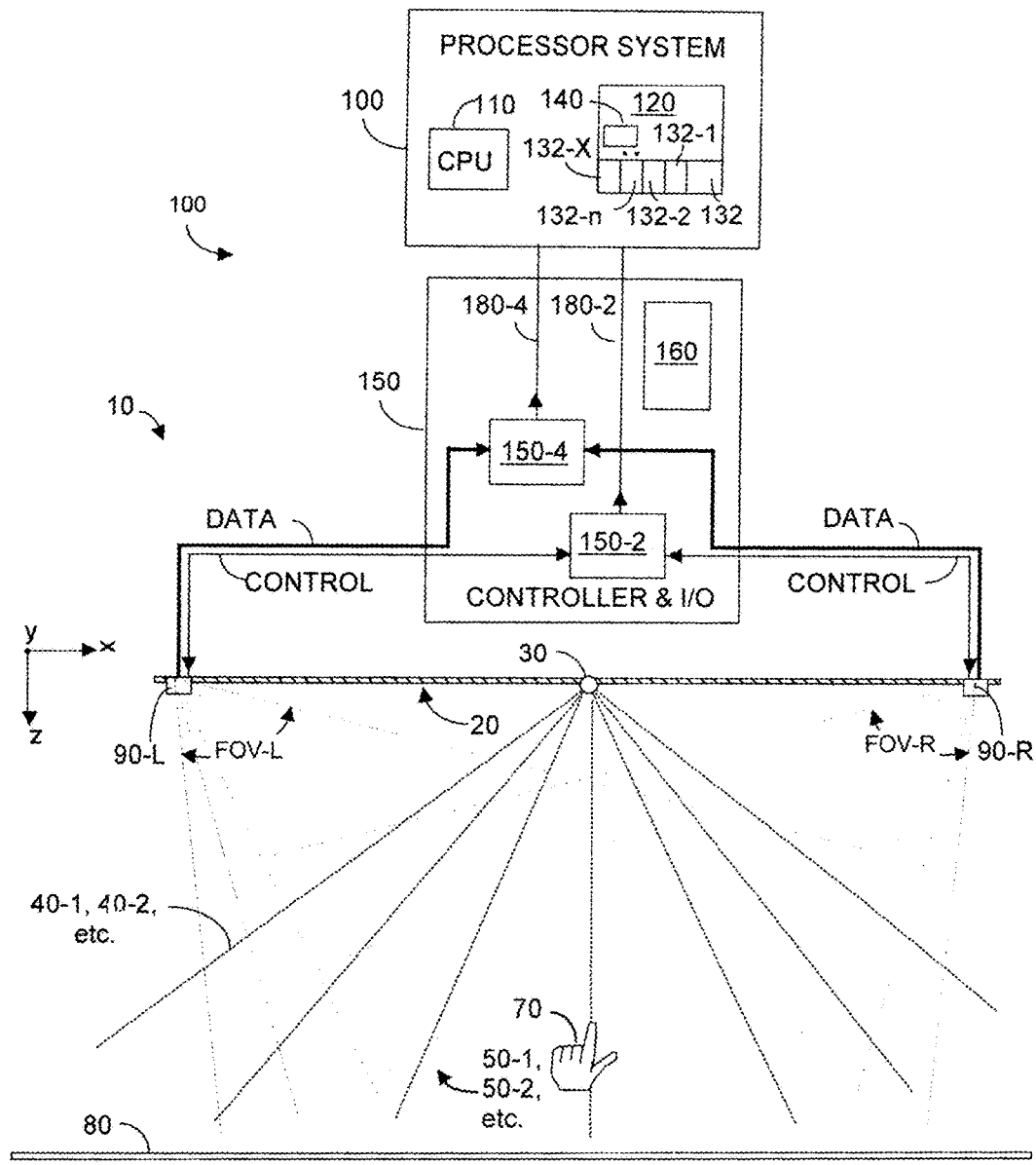
FIG. 8 is a functional block diagram showing an overall system, according to embodiments of the present invention.

FIG. 8 depicts components and functionality of overall architecture suitable to implement system 10 (see FIG. 1A) and device 20. The lower portion of FIG. 8 depicts the physical relationships between the three-dimensional field of view (FOV-R) of camera 90R, and the three-dimensional field of view (FOV-L) of camera 90L, and optical energy 40-1, 40-2 emanating from pattern projection system 30, preferably disposed symmetrically with respect to the two cameras. The intersection of fields FOV-R and FOV-L defines the frustum-shaped zone within which spaced-apart two-dimensional cameras 90R, 90L can image target objects, e.g., Teddy bear 60, user hand 70, etc. within the three-dimensional imaged scene. What is imaged will also include projectable patterns such as 50-1, 50-1 that are generated according to embodiments of the present invention. Various methods of generating the patterns, and acquired optical imagery during frame acquisition times of optical acquisition system 90 have been described, including methods to bring about artifact despeckling. In FIG. 8, rays that emanate from cameras 90R, 90L show the respective optical fields of view FOV-1, FOV-2 for the two cameras, in the (x,z) plane, where the y-axis is normal to the plane of FIG. 8. Lines emanating from pattern projection system 30 indicate optical energy representing the projected patterns.

Captured image data (DATA) from each camera is read out at a frame rate commanded by processor 110 in processor system 100, preferably within device 20 via control (CONTROL) lines, which lines are part of a controller and I/O system 150. As noted earlier, various algorithm and other software routines 132, 132-1, ... 132-n, etc. are stored in memory 120 within processor system 100. Upon execution by processor 110, various of these routines govern pattern generation and projection and command actuator 390, and other of these algorithms and routines are used to create the (x,y,z) depth map from the two-dimensional data acquired by camera 90L, 90R. Inter-system communication within system 10 can be carried out using various protocols, e.g., MIPI, HDMI, USB, etc. Controller and I/O system 150 includes logic circuitry 150-1, 150-2 to govern flow of incoming optical image data via lines 156-1, 156-2, e.g., USB bus lines to device 20 processor system 100. Volatile memory flash memory 154 is provided and can preserve configuration data for each camera 90R, 90L, including calibration data that describes the geometric properties, i.e., intrinsic and extrinsic parameters, per camera.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. Thus, modifications and variations may be made to the disclosed embodiments without departing from the subject and spirit of the invention as defined by the following claims.

What is claimed is:

1. A pattern projection system with reduced speckle artifacts, useable with an imaging system that has an optical acquisition system to acquire (x,y) image data from an imaged scene and that includes a processor system to at least process said (x,y) image data to yield (x,y,z) depth map data, said pattern projection system configured to emit patterned light along a projection optical axis onto said imaged scene, the projection system comprising:

a source of optical energy emitting coherent uncollimated light along said optical axis;

a diffractive optical element (DOE) with a lensing function, having a front surface disposed along said optical axis so as to receive at least a fraction of said coherent uncollimated light emitted by said source of optical energy, and having a rear surface through which at least one projectable pattern of optical energy emerges; and means for reducing speckling in said at least one projectable pattern, said means for reducing specking mechanically uncoupled from said optical acquisition system;

wherein acquisition and processing of optical information from said imaged scene including said at least one projectable pattern yields (x,y,z) depth map data with higher quality than if unmitigated speckling were present in a projected pattern.

2. The pattern projection system of claim 1, wherein said means for reducing speckling includes an actuator coupled to said DOE to controllably reposition said DOE a desired amount Δ normal to said optical axis, said actuator being functionally coupled to said processor system, which processor system dictates said amount Δ;

wherein said DOE outputs a first projectable pattern p1 when said actuator causes said DOE to reposition Δ1, and wherein said DOE outputs a second projectable pattern p2 when said actuator causes said DOE to reposition Δ2; and wherein said p1 and said p2 operate in at least one mode selected from a group consisting of (A) space-time mode, and (B) despeckle mode wherein reposition of said DOE is rapidly repetitive relative to a frame acquisition time of said optical acquisition system, whereby which at least some coherent light speckling from each said projectable pattern is reduced.

3. The pattern projection system of claim 1, wherein said means for reducing speckling includes an actuator coupled to said pattern projection system to controllably reposition said pattern projection system a desired amount Δn normal to said optical axis, said actuator being functionally coupled to said processor system, which processor system dictates said amount Δn;

wherein said DOE outputs a first projectable pattern p1 when said actuator causes said DOE to reposition Δn1, and wherein said DOE outputs a second projectable pattern p2 when said actuator causes said DOE to reposition Δn2; and wherein said p1 and said p2 functionally despeckle at least some coherent light speckling from each said projectable pattern.

4. The pattern projection system of claim 1, wherein said projectable pattern comprises coherent and collimated optical energy.

5. The pattern projection system of claim 2, wherein said actuator is selected from a group consisting of (a) an electro-mechanical actuator, (b) a piezoelectric actuator, (c) a linear voice coil motor actuator, and (d) a micro mechanical-electro-mechanical (MEM) actuator.

6. The pattern projection system of claim 2, wherein said actuator controllably repositions said DOE in two-dimensional cosine space.

7. The pattern projection system of claim 2, wherein at least one projectable pattern is selected and projected from a pattern family $\mathcal{M}$ that is related by at least one of (A) translation operation, and (B) rotation operation in two-dimensional direction cosine space to another pattern.

8. The pattern projection system of claim 1, wherein said DOE performs a collimation function and a pattern projection function; and wherein at least some coherent light from said source of optical energy entering said front surface of said DOE becomes collimated before exiting said second surface of said DOE.

9. The pattern projection system of claim 1, wherein said DOE performs a collimation function and a pattern projection function; and wherein at least some coherent light from said source of optical energy entering said front surface of said DOE becomes spread out before exiting said second surface of said DOE as collimated light.

10. The pattern projection system of claim 1, wherein:

said optical acquisition system acquires (x,y) optical data using at least a first two-dimensional camera having a pixel array, and a second two-dimensional camera having a pixel array, said first camera and said second camera being fixedly disposed relative to one another;

wherein each said camera acquires optical data at a frame rate having a frame rate period;

wherein during a first acquisition frame a first projectable pattern is generated and projected, and during a next acquisition frame a second projectable pattern is generated and projected; and wherein a characteristic of said second protectable pattern is determined by analysis of optical data acquired during said first acquisition frame.

11. The pattern projection system of claim 1, wherein said source of optical energy has at least one characteristic selected from a group consisting of (a) said optical energy is at least substantially coherent, (b) said optical energy has a wavelength visible to humans, (c) said optical energy has an infrared wavelength, and (e) said light source is a laser diode.

12. The pattern projection system of claim 2, wherein:

under command of said processor system executing at least one iterative routine, said actuator positions said DOE by Δ1, said first projectable pattern p1 is generated and projected, and (x,y) data is acquired by said optical acquisition system during a first acquisition frame time t1;

under command of said processor system executing said at least one iterative routine, said actuator positions said DOE by Δ2, said second projectable pattern p2 is generated and projected, and (x,y) data is acquired by said optical acquisition system during a second acquisition frame time t2;

said processor system computes at least a first cost function and a second cost function for each first pixel in a pixel array associated with an (x,y) camera in said optical acquisition system;

said processor system computes (x,y,z) depth estimates from said first cost function and said second cost function;

an (x,y,z) three-dimensional depth map is output; and said iterative routine iteratively repeats, now using magnitude of Δ2 as Δ1.

13. The projection system of claim 2, wherein:

under command of said processor system executing at least one iterative routine, said actuator positions said DOE to a first incident angle α1, said first projectable pattern p1 is generated and projected, and (x,y) data is acquired by said optical acquisition system during a first acquisition frame time t1;

under command of said processor system executing said at least one iterative routine, said actuator positions said DOE to a second incident angle α2, said second projectable pattern p2 is generated and projected, and (x,y) data is acquired by said optical acquisition system during a second acquisition frame time t2;

said processor system computes at least a first cost function and a second cost function for each first pixel in a pixel array associated with an (x,y) camera in said optical acquisition system;

said processor system computes (x,y,z) depth estimates from said first cost function and said second cost function;

an (x,y,z) three-dimensional depth map is output; and said iterative routine iteratively repeats, now using magnitude of α2 as α1.

14. A pattern, projection system to mitigate speckle artifacts to enhance dynamic reconstruction of a three-dimensional (x,y,z) depth map obtained from an imaged scene in which at least one target object may be present, said scene imaged by an optical acquisition system that optically acquires within a field of view (FOV) of said optical acquisition system at least a portion of said scene, said imaged scene processed by a processor system coupled to said optical acquisition system to yield said three-dimensional (x,y,z) depth map, the pattern projection system, coupleable to said optical acquisition system, configured to generate and project at least one projectable pattern along an optical axis, said pattern projection system including:
- a source of optical energy emitting coherent uncollimated light along said optical axis;
- a diffractive optical element (DOE) with a lensing function, having a front surface disposed along said optical axis so as to receive at least a fraction of said coherent uncollimated light emitted by said source of optical energy, and having a rear surface through which at least one projectable pattern of optical energy emerges; and
- an actuator coupled to said DOE to controllably reposition said DOE a desired amount Δ normal to said optical axis, said actuator being functionally coupled to said processor system, which processor system dictates said amount Δ, but said actuator being mechanically uncoupled from said optical acquisition system;
- wherein said DOE outputs a first projectable pattern p1 when said actuator causes said DOE to reposition Δ1, and wherein said DOE outputs a second projectable pattern p2 when said actuator causes said DOE to reposition Δ2;
- wherein each said projectable pattern p1 and p2 operates in at least one mode selected from a group consisting of (A) space-time mode, and (B) a functional despeckling mode in which at least some coherent light speckling is reduced; and
- a processor system, coupled to said actuator and to said optical acquisition system, including at least a processor, memory, at least one routine stored in said memory and executable by said processor to at least intelligently command repositioning of said DOE by said actuator.

15. The pattern projection system of claim 14, wherein said optical acquisition system includes at least one of (A) a first camera and a second camera spaced apart from said first camera, each camera being a two-dimensional camera and having a field of view wherein said optical acquisition system FOV is defined by overlapping fields of view of said first camera and said second camera, wherein at least a portion of said scene lies within overlapping fields of view of said first camera and said second camera, and (B) a structured light system.

16. The pattern projection system of claim 14, wherein at least one projectable pattern is selected and projected from a pattern family $\mathcal{M}$ that is related by at least one of translation operation and rotation operation in two-dimensional direction cosine space to another pattern.

17. The projection system of claim 14, wherein a second projectable pattern to be projected is selected by said processor system according to at least one characteristic of a preceding projected pattern.

18. The projection system of claim 14, wherein:
- under command of said processor system executing at least one iterative routine, said actuator positions said DOE by Δ1, said first projectable pattern p1 is generated and projected, and (x,y) data is acquired by said optical acquisition system during a first acquisition frame time t1;
- under command of said processor system executing said at least one iterative routine, said actuator positions said DOE by Δ2, said second projectable pattern p2 is generated and projected, and (x,y) data is acquired by said optical acquisition system during a second acquisition frame time t2;
- said processor system computes at least a first cost function and a second cost function for each first pixel in a pixel array associated with an (x,y) camera in said optical acquisition system;
- said processor system computes (x,y,z) depth estimates from said first cost function and said second cost function;
- an (x,y,z) three-dimensional depth map is output; and
- said iterative routine iteratively repeats, now using magnitude of Δ2 as Δ1.

19. The projection system of claim 14, wherein:
- under command of said processor system executing at least one iterative routine, said actuator positions said DOE to a first incident angle $\alpha 1$, said first projectable pattern p1 is generated and projected, and (x,y) data is acquired by said optical acquisition system during a first acquisition frame time t1;
- under command of said processor system executing said at least one iterative routine, said actuator positions said DOE to a second incident angle $\alpha 2$, said second projectable pattern p2 is generated and projected, and (x,y) data is acquired by said optical acquisition system during a second acquisition frame time t2;
- said processor system computes at least a first cost function and a second cost function for each first pixel in a pixel array associated with an (x,y) camera in said optical acquisition system;
- said processor system computes (x,y,z) depth estimates from said first cost function and said second cost function;
- an (x,y,z) three-dimensional depth map is output; and
- said iterative routine iteratively repeats, now using magnitude of $\alpha 2$ as $\alpha 1$.

20. The projection system of claim 14, wherein said first projectable pattern p1 and said second projectable pattern p2 operate in at least one mode selected from a group consisting of (A) space-time mode, and (B) despeckle mode wherein reposition of said DOE is rapidly repetitive relative to a frame acquisition time of said optical acquisition system, whereby which at least some coherent light speckling from each said projectable pattern is reduced.

* * * * *

UNITED STATES PATENT AND TRADEMARK OFFICE
CERTIFICATE OF CORRECTION

PATENT NO. : 9,826,216 B1
APPLICATION NO. : 15/274994
DATED : November 21, 2017
INVENTOR(S) : Aryan Hazeghi et al.

Page 1 of 1

It is certified that error appears in the above-identified patent and that said Letters Patent is hereby corrected as shown below:

In the Claims

Column 28, Line 1, Claim 10, delete "protectable" and insert -- projectable --

Column 28, Line 57, Claim 14, delete "pattern," and insert -- pattern --

Signed and Sealed this
Eighteenth Day of June, 2019

Andrei Iancu
*Director of the United States Patent and Trademark Office*